United States Patent
Lee et al.

(10) Patent No.: US 11,445,141 B2
(45) Date of Patent: Sep. 13, 2022

(54) CDS CIRCUIT, OPERATING METHOD THEREOF, AND IMAGE SENSOR INCLUDING CDS CIRCUIT

(71) Applicant: SAMSUNG ELECTRONICS CO., LTD., Suwon-si (KR)

(72) Inventors: Hyeokjong Lee, Seoul (KR); Yongsuk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/355,443

(22) Filed: Jun. 23, 2021

(65) Prior Publication Data
US 2022/0060647 A1 Feb. 24, 2022

(30) Foreign Application Priority Data
Aug. 21, 2020 (KR) ........................ 10-2020-0105533

(51) Int. Cl.
*H04N 5/378* (2011.01)
*H04N 5/355* (2011.01)

(52) U.S. Cl.
CPC ........... *H04N 5/378* (2013.01); *H04N 5/3559* (2013.01)

(58) Field of Classification Search
CPC .............................. H04N 5/378; H04N 5/3559
See application file for complete search history.

(56) References Cited

U.S. PATENT DOCUMENTS

| | | | |
|---|---|---|---|
| 9,380,246 B2 | 6/2016 | Lee | |
| 9,386,240 B1 | 7/2016 | Johansson et al. | |
| 9,608,614 B2* | 3/2017 | Sugiyama | ............ G09G 3/3233 |
| 10,356,351 B1 | 7/2019 | Ebihara et al. | |
| 10,431,608 B2 | 10/2019 | Ebihara | |
| 10,432,879 B2 | 10/2019 | Chang et al. | |
| 11,159,760 B2* | 10/2021 | Kobayashi | ......... H04N 5/23227 |
| 11,240,455 B2* | 2/2022 | Yamashita | ............. H04N 5/378 |
| 2015/0187335 A1* | 7/2015 | Sugiyama | ............ H04N 5/3765 |
| | | | 345/208 |
| 2018/0067152 A1 | 3/2018 | Nakahara | |
| 2019/0149754 A1 | 5/2019 | Otaka | |
| 2020/0412992 A1* | 12/2020 | Kobayashi | ............. H04N 5/378 |
| 2021/0185256 A1* | 6/2021 | Yamashita | ............. H03M 1/56 |

* cited by examiner

*Primary Examiner* — Nicholas G Giles
(74) *Attorney, Agent, or Firm* — Sughrue Mion, PLLC

(57) ABSTRACT

A correlated double sampling (CDS) circuit, an operating method thereof, and an image sensor including the CDS circuit are disclosed. The CDS circuit includes a first comparator configured to operate based on a first bias current, and compare, with a ramp signal, a pixel voltage that is output from a pixel, during a first period and a fourth period during which the pixel operates in a low conversion gain (LCG) mode, a second comparator configured to operate based on a second bias current, and compare, with the ramp signal, the pixel voltage output from the pixel, during a second period and a third period during which the pixel operates in a high conversion gain (HCG) mode, the second period being after the first period, the third period being after the second period, and the fourth period being after the third period.

20 Claims, 21 Drawing Sheets

CDS CIRCUIT, OPERATING METHOD THEREOF, AND IMAGE SENSOR INCLUDING CDS CIRCUIT

CROSS-REFERENCE TO THE RELATED APPLICATION

This application is based on and claims priority under 35 U.S.C. § 119 to Korean Patent Application No. 10-2020-0105533, filed on Aug. 21, 2020, in the Korean Intellectual Property Office, the disclosure of which is incorporated by reference herein in its entirety.

BACKGROUND

The inventive concept relates to an image sensor, and more particularly, to a correlated double sampling (CDS) circuit, an operating method thereof, and an image sensor including the CDS circuit.

An image sensor captures a two-dimensional or three-dimensional image of an object. An image sensor generates an image of an object by using a photoelectric conversion element configured to respond to an intensity of light reflected from the object. Along with the development of complementary metal-oxide semiconductor (CMOS) technology, CMOS image sensors using a CMOS have been widely used. To increase a dynamic range of an image sensor, a dual conversion gain technique by which one pixel has two types of conversion gains has been developed. Research into a CDS circuit for processing a signal of a pixel having a dual conversion gain and an operating method thereof has been in demand.

SUMMARY

According to an aspect of the inventive concept, there is provided a correlated double sampling (CDS) circuit including a first comparator configured to operate based on a first bias current, and compare, with a ramp signal, a pixel voltage that is output from a pixel, during a first period and a fourth period during which the pixel operates in a low conversion gain (LCG) mode, and a second comparator configured to operate based on a second bias current; and compare, with the ramp signal, the pixel voltage output from the pixel, during a second period and a third period during which the pixel operates in a high conversion gain (HCG) mode, the second period being after the first period, the third period being after the second period, and the fourth period being after the third period. The first comparator is further configured to operate based on a third bias current that is lower than the first bias current, during the second period and the third period, and the second comparator is further configured to operate based on a fourth bias current that is lower than the second bias current, during the first period and the fourth period.

According to an aspect of the inventive concept, there is provided an image sensor including a pixel configured to output a first pixel signal in a first conversion gain mode, and output a second pixel signal in a second conversion gain mode, a ramp signal generator configured to generate a ramp signal of which a level falls with a slope, and a correlated double sampling (CDS) circuit configured to receive the first pixel signal and the second pixel signal from the pixel through a column line, generate a first comparison result signal by comparing the ramp signal with the received first pixel signal, and generate a second comparison result signal by comparing the ramp signal with the received second pixel signal. The CDS circuit includes a first comparator configured to operate based on a first bias current; and compare, with the ramp signal, the received first pixel signal, during a first sub-period in a readout period for the pixel; and a second comparator configured to operate based on a second bias current; and compare, with the ramp signal, the received second pixel signal, during a second sub-period in the readout period, the second sub-period being after the first sub-period. The first comparator is further configured to operate based on a third bias current that is lower than the first bias current, during the second sub-period, and the second comparator is further configured to operate based on a fourth bias current that is lower than the second bias current, during the first sub-period.

According to an aspect of the inventive concept, there is provided an operating method of a correlated double sampling (CDS) circuit including a first comparator and a second comparator, the method including generating a first reset value according to a first reset signal that is output from a pixel, by using the first comparator during a first period, generating a second reset value according to a second reset signal that is output from the pixel, by using the second comparator during a second period, generating a second image value according to a second image signal that is output from the pixel, by using the second comparator during a third period, and generating a first image value according to a first image signal that is output from the pixel, by using the first comparator during a fourth period, the second period being after the first period, the third period being after the second period, and the fourth period being after the third period. During the first period and the fourth period, the first comparator operates based on a first bias current, and during the second period and the third period, the first comparator operates based on a second bias current that is lower than the first bias current.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

The inventive concept provides a correlated double sampling (CDS) circuit capable of processing a pixel signal of a pixel having a dual conversion gain within one frame and reducing power consumption, an operating method thereof, and an image sensor including the CDS circuit.

Figure 1:
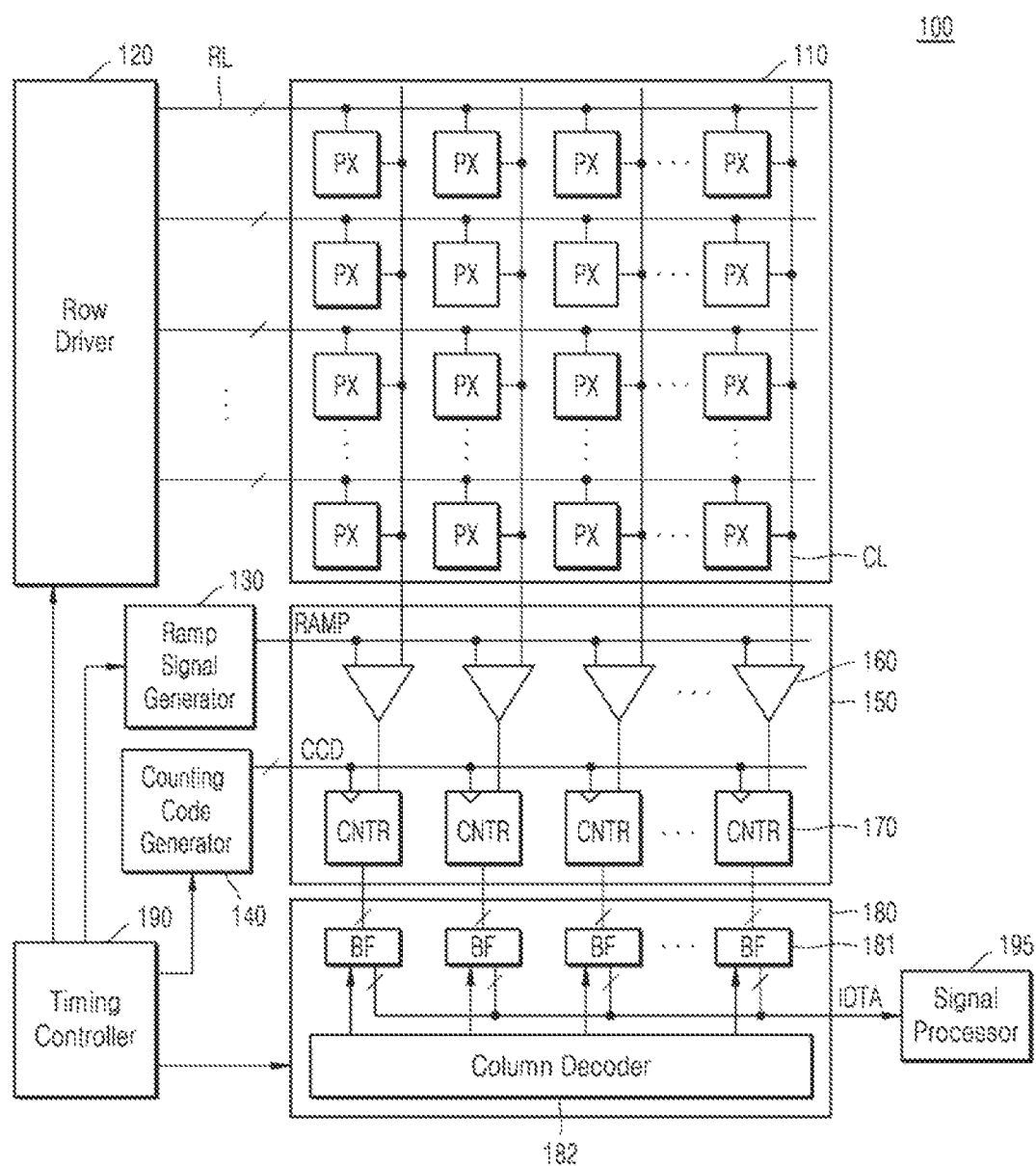
FIG. 1 is a block diagram of an image sensor according to an embodiment of the inventive concept.

FIG. 1 is a block diagram of an image sensor 100 according to an embodiment of the inventive concept.

The image sensor 100 may be mounted in an electronic device having an image or light sensing function. For example, the image sensor 100 may be mounted in electronic devices such as a camera, a smartphone, a wearable device, an Internet of Things (IoT) device, a tablet personal computer (PC), a personal digital assistant (PDA), a portable multimedia player (PMP), and a navigation device. In addition, the image sensor 100 may be mounted in electronic devices provided as components to a vehicle, furniture, a manufacturing facility, a door, various measurement instruments, and the like.

The image sensor 100 may include a pixel array 110, a row driver 120, a ramp signal generator 130, a counting code generator 140, an analog-digital conversion (ADC) circuit 150, a data output circuit 180, and a timing controller 190. The image sensor 100 may further include a signal processor 195.

The pixel array 110 includes a plurality of row lines RL, a plurality of column lines CL, and a plurality of pixels PX connected to the plurality of row lines RL and the plurality of column lines CL and arranged in rows and columns.

Each of the plurality of pixels PX may include at least one photoelectric conversion element, and a pixel PX may sense light by using the photoelectric conversion element and output an image signal that is an electrical signal according to the sensed light. For example, the photoelectric conversion element may include a photodiode, a phototransistor, a photogate, a pinned photodiode, or the like.

Each of the plurality of pixels PX may sense light of a spectral range. For example, the plurality of pixels PX may include a red pixel configured to convert light of a red spectral range into an electrical signal, a green pixel configured to convert light of a green spectral range into an electrical signal, and a blue pixel configured to convert light of a blue spectral range into an electrical signal. However, the plurality of pixels PX are not limited thereto and may further include a white pixel. As another example, the plurality of pixels PX may include pixels combined in a different color composition, e.g., a yellow pixel, a cyan pixel, and a green pixel.

A color filter array configured to transmit light of a spectral range therethrough may be on the plurality of pixels PX, and a color which a corresponding pixel is sensible may be determined according to a color filter on each of the plurality of pixels PX. However, the present embodiment is not limited thereto, and according to an embodiment, a photoelectric conversion element may convert light of a wavelength band into an electrical signal according to a level of an electrical signal applied to the photoelectric conversion element.

In the pixel array 110 according to the present embodiment, a pixel PX may have a dual conversion gain. The dual conversion gain includes a low conversion gain and a high conversion gain. Herein, a conversion gain indicates a rate at which charges accumulated at a floating diffusion node (FD of FIG. 2) are converted into a voltage. Charges generated by the photoelectric conversion element may be transported to and accumulated at the floating diffusion node FD, and the charges accumulated at the floating diffusion node FD may be converted into a voltage according to a conversion gain. In this case, the conversion gain may vary according to a capacitance of the floating diffusion node FD, wherein the conversion gain may decrease as the capacitance increases and increase as the capacitance decreases.

The pixel PX may operate in a low conversion gain (LCG) mode in which the capacitance of the floating diffusion node FD is high or a high conversion gain (HCG) mode in which the capacitance of the floating diffusion node FD is low, and even when charges accumulated at the floating diffusion node FD are identical, a voltage of the floating diffusion node FD in the HCG mode is higher than a voltage of the floating diffusion node FD in the LCG mode. Configurations of a pixel PX and an operation of the pixel PX according to a conversion gain mode will be described below with reference to FIGS. 2 and 3.

A dark area may be vividly represented by first image data generated when the plurality of pixels PX in the pixel array 110 operate in the HCG mode, and a bright area may be vividly represented by second image data generated when the plurality of pixels PX in the pixel array 110 operate in the LCG mode.

According to an embodiment of the inventive concept, each of the plurality of pixels PX may continuously operate in the HCG mode and the LCG mode during a corresponding readout period (or referred to as a horizontal period) within one frame in which the pixel array 110 receives light once (in other words, one exposure of the image sensor (100)) and is scanned, and accordingly, the first image data and the second image data may be generated in a one-frame period. The first image data and the second image data may be merged to generate an image having a high dynamic range (HDR) in which a bright area (a high illumination area) and a dark area (a low illumination area) are vividly implemented. As described above, a dual conversion gain within one frame may be referred to as an intra-scene dual conversion gain, and hereinafter, the dual conversion gain used in the inventive concept indicates the intra-scene dual conversion gain.

The row driver 120 drives the pixel array 110 in units of rows. The row driver 120 may decode a row control signal (e.g., an address signal) received from the timing controller 190 and select at least one row line from among row lines constituting the pixel array 110 in response to the decoded row control signal. For example, the row driver 120 may generate a select signal for selecting one of a plurality of rows. Accordingly, the pixel array 110 outputs a pixel signal, e.g., a pixel voltage, from the row selected based on the select signal provided from the row driver 120. The pixel signal may include a reset signal and an image signal.

The row driver 120 may transmit control signals for outputting the pixel signal to the pixel array 110, and a pixel PX may output the pixel signal by operating in response to the control signals. According to an embodiment of the inventive concept, the row driver 120 may generate control signals for controlling a pixel PX to continuously operate in the HCG mode and the LCG mode in a readout period, and provide the control signals to the pixel array 110.

The ramp signal generator 130 may generate a ramp signal RAMP (e.g., a ramp voltage) of which a level increases or decreases with a slope, under control of the timing controller 190. The ramp signal RAMP may be provided to each of a plurality of correlated double sampling (CDS) circuits 160 included in the ADC circuit 150.

The counting code generator 140 may generate a counting code CCD under control of the timing controller 190. The counting code CCD may be provided to each of a plurality of counter circuits 170. According to an embodiment of the inventive concept, the counting code generator 140 may be implemented by a gray code generator. The counting code generator 140 may generate, as the counting code CCD, a plurality of code values having resolution according to a set number of bits. For example, when a 10-bit code is set, the counting code generator 140 may generate the counting code CCD including sequentially ascending or descending 1024 code values.

The ADC circuit 150 may include the plurality of CDS circuits 160 and the plurality of counter circuits 170. The ADC circuit 150 may convert a pixel signal (e.g., a pixel voltage) input from the pixel array 110 into a pixel value that is a digital signal. Each pixel signal received through each of the plurality of column lines CL is converted into a pixel value that is a digital signal by a CDS circuit 160 and a counter circuit 170.

The CDS circuit 160 may compare a pixel signal, e.g., a pixel voltage, received through a column line CL with the ramp signal RAMP and output the comparison result as a comparison result signal. When a level of the ramp signal RAMP is the same as a level of the pixel signal, the CDS circuit 160 may output a comparison result signal that transitions from a first level (e.g., logic high) to a second level (e.g., logic low). A time point when a level of the comparison result signal transitions may be determined according to the level of the pixel signal.

The CDS circuit 160 may sample a pixel signal provided from a pixel PX according to a CDS scheme. The CDS circuit 160 may sample a reset signal received as a pixel signal and compare the reset signal with the ramp signal RAMP to generate a comparison result signal according to the reset signal. The CDS circuit 160 may store the reset signal. Thereafter, the CDS circuit 160 may sample an image signal correlated to the reset signal and compare the image signal with the ramp signal RAMP to generate a comparison result signal according to the image signal.

According to an embodiment of the inventive concept, the CDS circuit 160 may include two comparators. For example, the two comparators may be implemented by an operational transconductance amplifier (OTA) (or a differential amplifier). As described above, the image sensor 100 may support the intra-scene dual conversion gain of a pixel PX and receive a reset signal according to the LCG mode (hereinafter, referred to as an LCG reset signal) and a reset signal according to the HCG mode (hereinafter, referred to as an HCG reset signal) from the pixel PX during a readout period. In this case, a level of the LCG reset signal may be different from a level of the HCG reset signal, and accordingly, the CDS circuit 160 may include two comparators, e.g., a first comparator and a second comparator, to respectively store the LCG reset signal and the HCG reset signal. The first comparator may process the LCG reset signal and an LCG image signal received from a pixel PX when the pixel PX operates in the LCG mode, and the second comparator may process the HCG reset signal and an HCG image signal received from the pixel PX when the pixel PX operates in the HCG mode.

According to an embodiment of the inventive concept, a bias current of each of the first comparator and the second comparator may be adjusted, wherein the second comparator may operate based on a low bias current while the first comparator is processing the LCG reset signal and the LCG image signal, and the first comparator may operate based on a low bias current while the second comparator is processing the HCG reset signal and the HCG image signal.

The counter circuit 170 may count a level transition time point of the comparison result signal output from the CDS circuit 160 and output a count value. According to an embodiment of the inventive concept, the counter circuit 170 may include a latch circuit and a calculation circuit. The latch circuit may receive the counting code CCD from the counting code generator 140 and the comparison result signal from the CDS circuit 160 and latch a code value of the counting code CCD at a time point when the level of the comparison result signal transitions. The latch circuit may latch each of a code value, e.g., a reset value, corresponding to a reset signal and a code value, e.g., an image signal value, corresponding to an image signal The calculation circuit may calculate the reset value and the image signal value and generate an image signal value from which a reset level of a pixel PX has been removed. The counter circuit 170 may output, as a pixel value, the image signal value from which the reset level has been removed Although it has been described in the present embodiment that the image sensor 100 includes the counting code generator 140, and the counter circuit 170 includes a circuit configured to latch a code value of the counting code CCD received from the counting code generator 140, the present embodiment is not limited thereto. According to an embodiment of the inventive concept, the image sensor 100 may not separately include the counting code generator 140, and the counter circuit 170 may be implemented by an up-counter, of which a count value sequentially ascends based on a counting clock signal provided from the timing controller 190, and a calculation circuit, by an up/down counter, or by a bit-wise inversion counter.

The data output circuit 180 may temporarily store a pixel value output from the ADC circuit 150 and then output the pixel value. The data output circuit 180 may include a plurality of column memories 181 and a column decoder 182. A column memory 181 stores a pixel value received from a counter circuit 170. According to an embodiment of the inventive concept, the plurality of column memories 181 may be provided to the plurality of counter circuits 170, respectively. A plurality of pixel values stored in the plurality of column memories 181 may be output as image data IDTA under control of the column memory 181.

The timing controller 190 may control operations or timings of the row driver 120, the ramp signal generator 130, the counting code generator 140, the ADC circuit 150, and the data output circuit 180 by outputting a control signal to each of the row driver 120, the ramp signal generator 130, the counting code generator 140, the ADC circuit 150, and the data output circuit 180.

The signal processor 195 may perform, on image data, noise reduction processing, gain control, waveform shaping processing, interpolation processing, white balance processing, gamma processing, edge enhancement processing, binning, and the like. According to an embodiment of the inventive concept, when the pixel array 110 operates in the HCG mode and the LCG mode within a one-frame period, the signal processor 195 may receive first image data according to the HCG mode and second image data according to the LCG mode from the data output circuit 180 and merge the first image data and the second image data to generate an image having the HDR. According to an embodiment of the inventive concept, the signal processor 195 may be included in a processor outside the image sensor 100.

Figure 2:
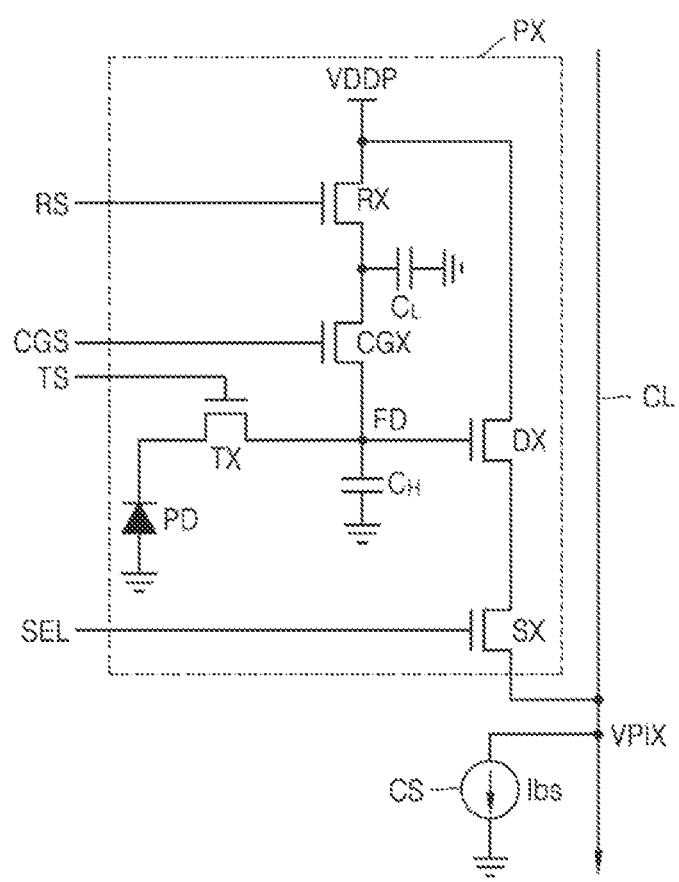
FIG. 2 is a circuit diagram of a pixel according to an example embodiment of the inventive concept.

FIG. 2 is a circuit diagram of a pixel PX according to an example embodiment of the inventive concept.

The pixel PX may include a photodiode PD, a plurality of transistors, e.g., a transport transistor TX, a reset transistor RX, a driving transistor DX, a select transistor SX, and a gain control transistor (or a conversion gain control transistor) CGX, and a capacitor $C_L$. A capacitor $C_H$, e.g., a parasitic capacitor, may be formed by the floating diffusion node FD. The capacitor $C_L$ may be a passive element having a fixed or variable capacitance, a parasitic capacitor formed by a source/drain of the gain control transistor CGX, or a parasitic capacitor formed in another pixel PX that may be connected to the source/drain of the gain control transistor CGX.

The photodiode PD may convert light incident from the outside into an electrical signal. The photodiode PD may generate charges according to light intensity. An amount of charges generated by the photodiode PD depends on an image capturing environment (a low or high level of illumination). For example, an amount of charges generated by the photodiode PD in a high illumination environment may reach a full well capacity (FWC) of the photodiode PD, but not in a low illumination environment.

The transport transistor TX, the reset transistor RX, the driving transistor DX, the select transistor SX, and the gain control transistor CGX may operate in response to control signals, e.g., a reset control signal RS, a transport control signal TS, a select signal SEL, and a gain control signal CGS, provided from the row driver 120, respectively.

The reset transistor RX may be turned on in response to the reset control signal RS applied to a gate terminal of the reset transistor RX so that the floating diffusion node FD is reset based on a pixel power supply voltage VDDP. In this case, the gain control transistor CGX may also be turned on based on the gain control signal CGS applied to a gate terminal of the gain control transistor CGX so that the pixel power supply voltage VDDP is applied to the floating diffusion node FD, thereby resetting the floating diffusion node FD.

The transport transistor TX may be turned on in response to the transport control signal TS applied to a gate terminal of the transport transistor TX so that charges generated by the photodiode PD are transported to the floating diffusion node FD. Charges may be accumulated at the floating diffusion node FD. In other words, charges may be accumulated in the capacitor $C_H$ formed by the floating diffusion node FD, or when the gain control transistor CGX is turned on, charges may be accumulated in the capacitor $C_H$ and the capacitor $C_L$.

The charges accumulated at the floating diffusion node FD may generate a voltage. In other words, the charges accumulated at the floating diffusion node FD may be converted into a voltage. A conversion gain (a unit of the conversion gain may be, for example, uV/e) may be determined by a capacitance of the floating diffusion node FD and may be inversely proportional to a magnitude of the capacitance. When the capacitance of the floating diffusion node FD increases, the conversion gain decreases, and when the capacitance of the floating diffusion node FD decreases, the conversion gain increases.

The driving transistor DX may operate as a source follower based on a bias current Ibs generated by a current source CS connected to a column line CL and output a voltage corresponding to a voltage of the floating diffusion node FD as a pixel voltage VPIX through the select transistor SX.

The select transistor SX may be used to select the pixel PX. The select transistor SX may be turned on in response to the select signal SEL applied to a gate terminal of the select transistor SX so that the pixel voltage VPIX (or a pixel current) output from the driving transistor DX is output to the column line CL. The pixel voltage VPIX may be provided to the ADC circuit 150 (of FIG. 1) through the column line CL.

The gain control transistor CGX may be turned on or off based on the gain control signal CGS applied to the gate terminal of the gain control transistor CGX, wherein, when the gain control transistor CGX is turned off, the floating diffusion node FD has a capacitance by the capacitor $C_H$, and when the gain control transistor CGX is turned on, the capacitor $C_L$ is connected to the floating diffusion node FD, and the floating diffusion node FD has a capacitance by the capacitor $C_H$ and the capacitor $C_L$ so that the capacitance of the floating diffusion node FD increases. A conversion gain when the gain control transistor CGX is turned off may be higher than a conversion gain when the gain control transistor CGX is turned on. A state in which the gain control transistor CGX is turned off may be referred to as the HCG mode, and a state in which the gain control transistor CGX is turned on may be referred to as the LCG mode.

As described above, the pixel PX may operate in either the HCG mode or the LCG mode according to turn-on or turn-off of the gain control transistor CGX. In the HCG mode, the conversion gain of the pixel PX may increase, and thus, a gain of circuits (e.g., the ADC circuit 150) configured to process the pixel voltage VPIX output from the pixel PX may relatively decrease. Therefore, a signal to noise ratio (SNR) of the image sensor 100 (of FIG. 1) may increase so that sensible minimum light intensity decreases, and a low light intensity sensing performance of the image sensor 100 may be improved. In the LCG mode, the capacitance of the floating diffusion node FD in the pixel PX is high, and thus, an FWC may increase. Therefore, a high light intensity sensing performance of the image sensor 100 may be improved.

As described above, because the pixel PX may sense light of low intensity and light of high intensity by providing a dual conversion gain, a dynamic range of the image sensor 100 may be widened (or increase). In addition, as described above with reference to FIG. 1, the pixel PX may continuously operate in the HCG mode and the LCG mode during a readout period, and the image sensor 100, e.g., the signal processor 195 (of FIG. 1), may generate an image having the HDR by merging first image data according to the HCG mode and second image data according to the LCG mode.

Figure 3:
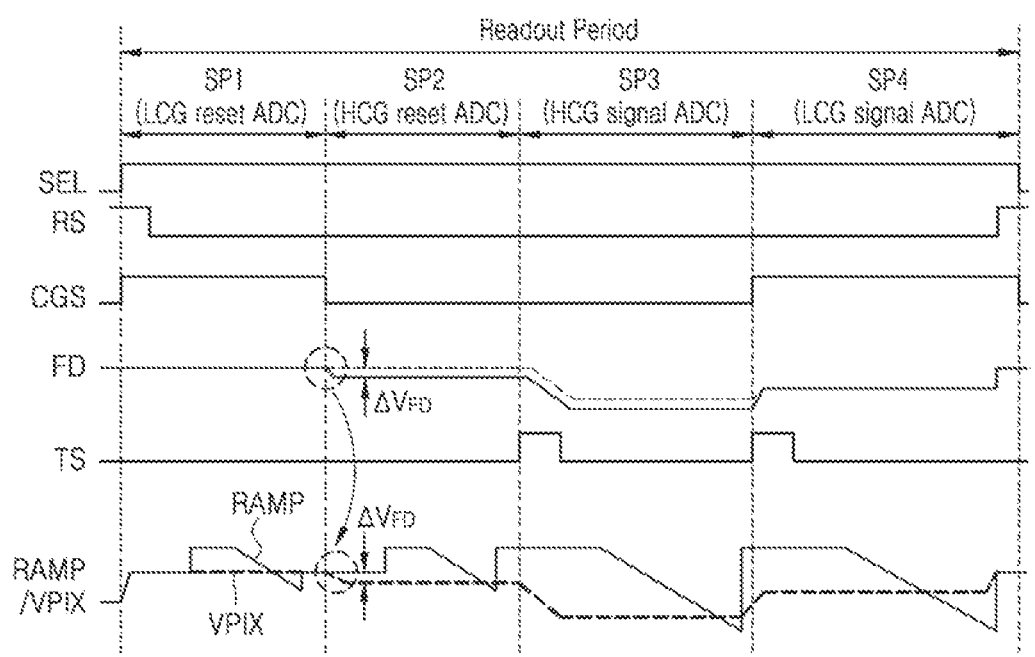
FIG. 3 is a timing diagram of an image sensor, according to an example embodiment of the inventive concept.

FIG. 3 is a timing diagram of an image sensor, according to an example embodiment of the inventive concept. FIG. 3 is a timing diagram of an image sensor when a pixel voltage is read from the pixel PX of FIG. 2.

A plurality of pixel voltages VPIX (or a plurality of pixel currents) may be read from a plurality of pixels PX in at least one row of the pixel array 110 (of FIG. 1) during one readout period (or a horizontal period). In other words, during a readout period, each of the plurality of pixels PX may output the pixel voltage VPIX, and the pixel voltage VPIX may be analog-digital-converted by a corresponding CDS circuit 160 and counter circuit 170 in the ADC circuit 150.

Referring to FIGS. 2 and 3, during a readout period, the select signal SEL may have an active level, e.g., logic high, and in response to the select signal SEL, the select transistor SX may be turned on so that the pixel PX is connected to the column line CL. Herein, the active level of a signal indicates a level by which a transistor to which the signal is applied may be turned on. In the inventive concept, it is assumed that logic high is the active level, and logic low is an inactive level.

The readout period may be divided into first to fourth sub-periods (or first to fourth periods) SP1 to SP4 according to the pixel voltage VPIX output from the pixel PX. In this case, according to the gain control signal CGS, the pixel PX may operate in the LCG mode during the first and fourth sub-periods SP1 and SP4 and operate in the HCG mode during the second and third sub-periods SP2 and SP3. As such, the pixel PX may have a dual conversion gain.

During the first sub-period SP1, a reset signal corresponding to a reset level (e.g., a voltage of the floating diffusion node FD that is reset) of the pixel PX may be read, and in this case, the pixel PX operates in the LCG mode, and thus, the LCG reset signal indicating a reset level in the LCG mode may be read.

In response to the active level of the gain control signal CGS, the gain control transistor CGX may be turned on. In response to the active level of the reset control signal RS the reset transistor RX may be turned on, and the floating diffusion node FD may be reset. The HCG reset signal corresponding to the voltage of the reset floating diffusion node FD may be output as the pixel voltage VPIX and analog-digital-converted. When the CDS circuit 160 (of FIG. 1) compares the ramp signal RAMP to the pixel voltage VPIX and outputs the comparison result as a comparison result signal, the counter circuit 170 (of FIG. 1) may generate a count value, e.g., an LCG reset value, corresponding to the HCG reset signal by latching a received counting code based on the comparison result signal.

During the second sub-period SP2, the reset signal corresponding to the reset level of the pixel PX may be read, and in this case, the pixel PX operates in the HCG mode, and thus, the HCG reset signal indicating a reset level in the HCG mode may be read.

When the gain control signal CGS transitions to the inactive level, e.g., logic low, the gain control transistor CGX may be turned off, and the pixel PX may switch to the HCG mode. When the gain control signal CGS transitions from logic high to logic low, a coupling capacitance of the floating diffusion node FD varies, and accordingly, the voltage of the floating diffusion node FD varies. For example, a coupling capacitance is formed between a row line RL to which the gain control signal CGS is applied and the floating diffusion node FD, and the coupling capacitance varies depending on a change in the gain control signal CGS. Accordingly, an offset voltage $\Delta V_{FD}$ according to a variation of the coupling capacitance is added to the voltage of the floating diffusion node FD, and in this case, the offset voltage $\Delta V_{FD}$ may be a positive or negative voltage.

As shown in FIG. 3, the pixel voltage VPIX may increase or decrease according to the offset voltage $\Delta V_{FD}$ of the floating diffusion node FD. In other words, the pixel voltage VPIX, i.e., the HCG reset signal, during the second sub-period SP2 may have a value obtained by adding the offset voltage $\Delta V_{FD}$ (e.g., a negative offset voltage) of the floating diffusion node FD to the LCG reset signal during the first sub-period SP1.

During the third sub-period SP3, the pixel PX may operate in the HCG mode, and the HCG image signal corresponding to a signal level of the pixel PX may be read. When the transport control signal TS is toggled to the active level, e.g., logic high, charges generated by the photodiode PD may be transported to and stored at the floating diffusion node FD. The driving transistor DX may output an image signal based on the voltage of the floating diffusion node FD according to an amount of charges transported from the photodiode PD. Because the pixel PX operates in the HCG mode, the HCG image signal may be output as the pixel voltage VPIX and analog-digital-converted.

During the fourth sub-period SP4, the pixel PX may operate in the LCG mode, and the LCG image signal corresponding to the signal level of the pixel PX may be read When the gain control signal CGS transitions to the active level, e.g., logic high, the gain control transistor CGX may be turned on, and the pixel PX may switch to the LCG mode. In this case, the coupling capacitance of the floating diffusion node FD may vary again. In other words, the coupling capacitance of the floating diffusion node FD may be the same as that during the first sub-period SP1, and the offset voltage $\Delta V_{FD}$ added to the voltage of the floating diffusion node FD during the second sub-period SP2 may be removed.

When the transport control signal TS is toggled to the active level, e.g., logic high, remaining charges among the charges generated by the photodiode PD (e.g., charges remaining without being transported to the floating diffusion node FD during the third sub-period SP3) may be transported to and stored at the floating diffusion node FD. The voltage of the floating diffusion node FD may vary depending on a change in the conversion gain and an amount of charges additionally transported from the photodiode PD during the fourth sub-period SP4, and the LCG image signal corresponding to the voltage of the floating diffusion node FD may be output as the pixel voltage VPIX and analog-digital-converted.

The reset level of the pixel PX may be different for each of the plurality of pixels PX and different over time. In addition, a conversion circuit, e.g., the CDS circuit 160 and the counter circuit 170, configured to convert a pixel voltage into a digital value may have a different offset for each column. Accordingly, a deviation may occur between read image signals, i.e., pixel values.

During a readout period, the image sensor 100 may first read a reset signal, then read an image signal by the CDS scheme based on the reset signal, and generate an actual image signal, i.e., a pixel value indicating an amount of charges generated by the photodiode PD, by subtracting the reset signal from the read image signal. Accordingly, a deviation between pixel values may be reduced. When the intra-scene dual conversion gain is provided, a reset signal and an image signal respectively corresponding to the HCG mode and the LCG mode may be read from the pixel PX during a readout period, and respective actual image signals for the HCG mode and the LCG mode, e.g., an HCG pixel value and an LCG pixel value, may be generated.

During the first sub-period SP1, the pixel PX may operate in the LCG mode, and the LCG reset signal may be read (referred to as LCG reset ADC), during the second sub-period SP2, the pixel PX may operate in the HCG mode, and the HCG reset signal may be read (referred to as HCG reset ADC), during the third sub-period SP3, the HCG image signal (e.g., an HCG signal voltage) may be read (referred to as HCG signal ADC), and during the fourth sub-period SP4, the pixel PX may operate in the LCG mode, and the LCG image signal (e.g., an LCG signal voltage) may be read (referred to as LCG signal ADC). As such, the LCG reset signal, the HCG reset signal, the HCG image signal, and the LCG image signal may be sequentially read during the readout period, and such a read scheme may be referred to a reset-reset-signal-signal (RRSS) read scheme.

As described above, an HCG reset level may be different from an LCG reset level. Therefore, to read the HCG image signal and the LCG image signal according to the CDS scheme, the CDS circuit 160 may include a first comparator and a second comparator, wherein the first comparator may sample and hold the LCG reset signal received as the pixel voltage VPIX during the first sub-period SP1, and the second comparator may sample and hold the HCG reset signal received as the pixel voltage VPIX during the second sub-period SP2. Thereafter, the second comparator may sample the HCG image signal received as the pixel voltage VPIX in correlation to the HCG reset signal during the third sub-period SP3, and the first comparator may sample the LCG image signal received as the pixel voltage VPIX in correlation to the LCG reset signal during the fourth sub-period SP4.

According to an embodiment of the inventive concept, the first comparator may perform an auto-zero operation based on the LCG reset signal and sample and hold an auto-zero level as the LCG reset signal during the first sub-period SP1. In addition, the second comparator may perform an auto-zero operation based on the HCG reset signal and sample and hold the auto-zero level as the HCG reset signal during the second sub-period SP2. According to the auto-zero operation of each of the first comparator and the second comparator, noise of a reset signal and an internal offset of each of the first comparator and the second comparator may be removed. In addition, according to the auto-zero operation, a voltage level of the pixel voltage VPIX may be located within a voltage level range in which the ramp signal RAMP varies, so that sampling based on the ramp signal RAMP is accurately performed. In other words, an accurate time point when a voltage level of the ramp signal RAMP is the same as the voltage level of the pixel voltage VPIX may be determined.

Figure 4:
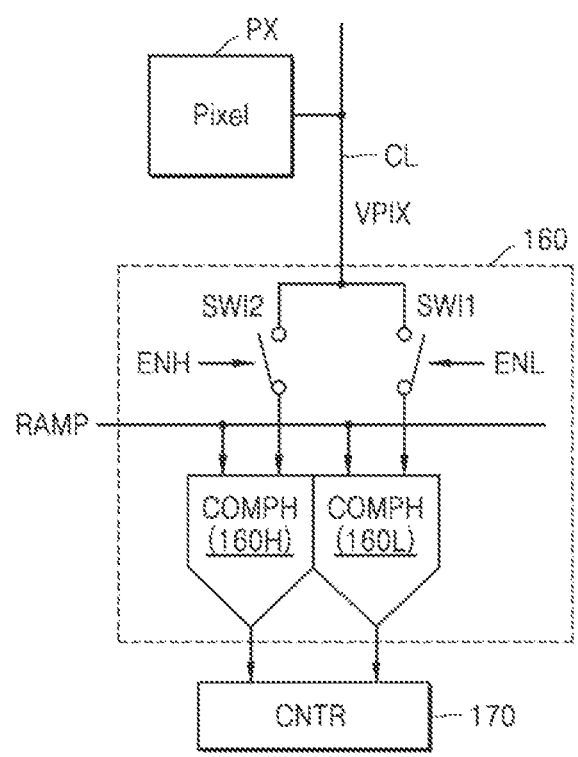
FIG. 4 is a block diagram of a correlated double sampling (CDS) circuit according to an example embodiment of the inventive concept.

FIG. 4 is a block diagram of a CDS circuit 160 according to an example embodiment of the inventive concept. For convenience of description, a pixel PX and a counter circuit 170 are shown together.

Referring to FIG. 4, the CDS circuit 160 may include a first comparator (COMPL) 160L, a second comparator (COMPH) 160H, a first input switch SWI1, and a second input switch SWI2. The COMPL 160L and the COMPH 160H may be implemented by an OTA, a differential amplifier, or the like. The first input switch SWI1 and the second input switch SWI2 may be referred to as an input switching circuit.

The first input switch SWI1 may be turned on in response to a first enable signal ENL so that a pixel signal, e.g., the pixel voltage VPIX, received from the pixel PX through a column line CL is delivered to the COMPL 160L. The pixel voltage VPIX may include a reset signal and an image signal. In this case, the first input switch SWI1 may be turned on when the pixel PX operates in the LCG mode, and the COMPL 160L may compare a first reset signal to a first image signal according to the LCG mode with the ramp signal RAMP. The counter circuit 170 may convert a comparison result signal output from the COMPL 160L into a digital signal.

The second input switch SWI2 may be turned on in response to a second enable signal ENH so that the pixel voltage VPIX is delivered to the COMPH 160H. In this case, the second input switch SWI2 may be turned on when the pixel PX operates in the HCG mode, and the COMPH 160H may compare a second reset signal and a second image signal according to the HCG mode with the ramp signal RAMP. The counter circuit 170 may convert a comparison result signal output from the COMPH 160H into a digital signal. Although FIG. 4 shows that one counter circuit 170 receives comparison result signals from the COMPL 160L and the COMPH 160H, the present embodiment is not limited thereto, and two counter circuits 170 may be provided for the CDS circuit 160 so that the two counter circuits 170 respectively receive comparison result signals from the COMPL 160L and the COMPH 160H and analog-digital-convert the received comparison result signals.

Each of the COMPL 160L and the COMPH 160H operates based on a constant current, i.e., a bias current, and thus, power consumption may increase compared to when one comparator is used. The CDS circuit 160 according to an embodiment of the inventive concept may adjust a bias current of the COMPL 160L and a bias current of the COMPH 160H based on an operating state of each of the COMPL 160L and the COMPH 160H as described below, thereby reducing the constant current. Accordingly, power consumption of the CDS circuit 160 and the image sensor 100 may be reduced.

Figure 5:
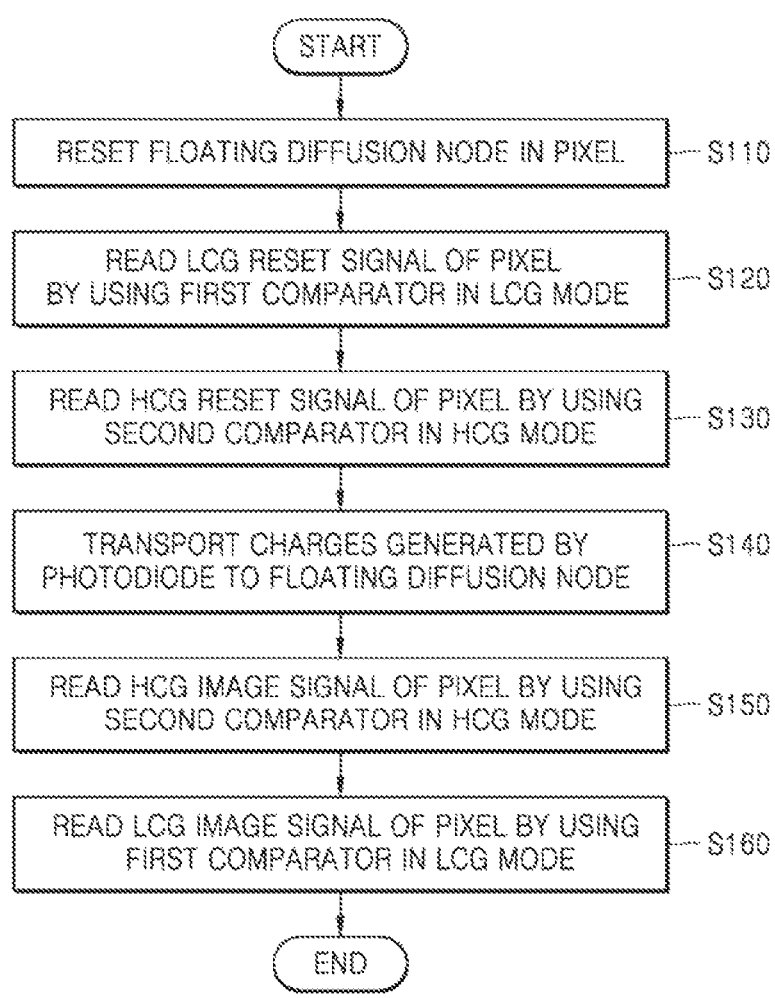
FIG. 5 is a flowchart of an operating method of an image sensor, according to an example embodiment of the inventive concept.

FIG. 5 is a flowchart of an operating method of an image sensor, according to an example embodiment of the inventive concept. The method of FIG. 5 may be performed by a pixel PX and a CDS circuit 160 in the image sensor 100.

Referring to FIGS. 2, 4, and 5, in operation S110, the floating diffusion node FD in the pixel PX may be reset. As described above with reference to FIG. 2, the reset transistor RX and the gain control transistor CGX may be turned on so that the pixel power supply voltage VDDP is applied to the floating diffusion node FD.

In operation S120, the LCG reset signal of the pixel PX may be read by using the COMPL 160L in the LCG mode. In operation S120, the reset transistor RX may be turned off, and the gain control transistor CGX may maintain a turn-on state. Accordingly, the pixel PX may operate in the LCG mode, and the LCG reset signal according to an LCG may be output. The COMPL 160L may receive the LCG reset signal of the pixel PX, compare the LCG reset signal with the ramp signal RAMP, and output a comparison result signal. The comparison result signal may be counted as an LCG reset value by the counter circuit 170.

Thereafter, in operation S130, the HCG reset signal of the pixel PX may be read by using the COMPH 160H in the HCG mode. In operation S130, the gain control transistor CGX may be turned off, and accordingly, the pixel PX may operate in the HCG mode. Due to a change in the capacitance of the floating diffusion node FD, the voltage of the floating diffusion node FD may vary, and the HCG reset signal may be different from the LCG reset signal. For example, the HCG reset signal may be lower than the LCG reset signal.

The HCG reset signal according to an HCG may be output, and the COMPH 160H may receive the HCG reset signal of the pixel PX, compare the HCG reset signal with the ramp signal RAMP, and output a comparison result signal. The comparison result signal may be counted as an HCG reset value by the counter circuit 170.

Thereafter, in operation S140, charges generated by the photodiode PD may be transported to the floating diffusion node FD. The transport transistor TX may be turned on so that the charges generated by the photodiode PD may be accumulated at the floating diffusion node FD. Accordingly, a voltage level of the floating diffusion node FD may decrease.

In operation S150, the HCG image signal of the pixel PX may be read by using the COMPH 160H in the HCG mode. Like operation S130, in operation S140, the gain control transistor CGX may be turned off, and accordingly, the pixel PX may operate in the HCG mode. However, the pixel voltage VPIX according to the voltage level of the floating diffusion node FD, which is changed in operation S140, may be output as the HCG image signal.

The COMPH 160H may receive the HCG image signal of the pixel PX, compare the HCG image signal with the ramp signal RAMP, and output a comparison result signal. The comparison result signal may be counted as an HCG image value by the counter circuit 170, and an HCG pixel value indicating a level according to the intensity of light received by the photodiode PD may be generated by subtracting the HCG reset value counted in operation S130 from the HCG image value.

In operation S160, the LCG image signal of the pixel PX may be read by using the COMPL 160L in the LCG mode. In operation S160, the gain control transistor CGX may be turned on again so that the pixel PX may operate in the LCG mode. In addition, in response to toggling of the transport control signal TS to the active level, e.g., logic high, remaining charges among the charges generated by the photodiode PD may be transported to and stored at the floating diffusion node FD.

The pixel voltage VPIX according to a voltage level of the floating diffusion node FD may be output as the LCG image signal. The LCG image signal indicates an image signal in the LCG mode.

The COMPL 160L may receive the LCG image signal of the pixel PX, compare the LCG image signal with the ramp signal RAMP, and output a comparison result signal. The comparison result signal may be counted as an LCG image value by the counter circuit 170, and an LCG pixel value indicating a level according to the intensity of light received by the photodiode PD may be generated by subtracting the LCG reset value counted in operation S120 from the LCG image value.

Through the operations described above, LCG image data and HCG image data according to the plurality of pixels PX in the pixel array 110 may be generated, and the HCG image data may have a relatively lower luminance than the LCG image data.

Figure 6A:
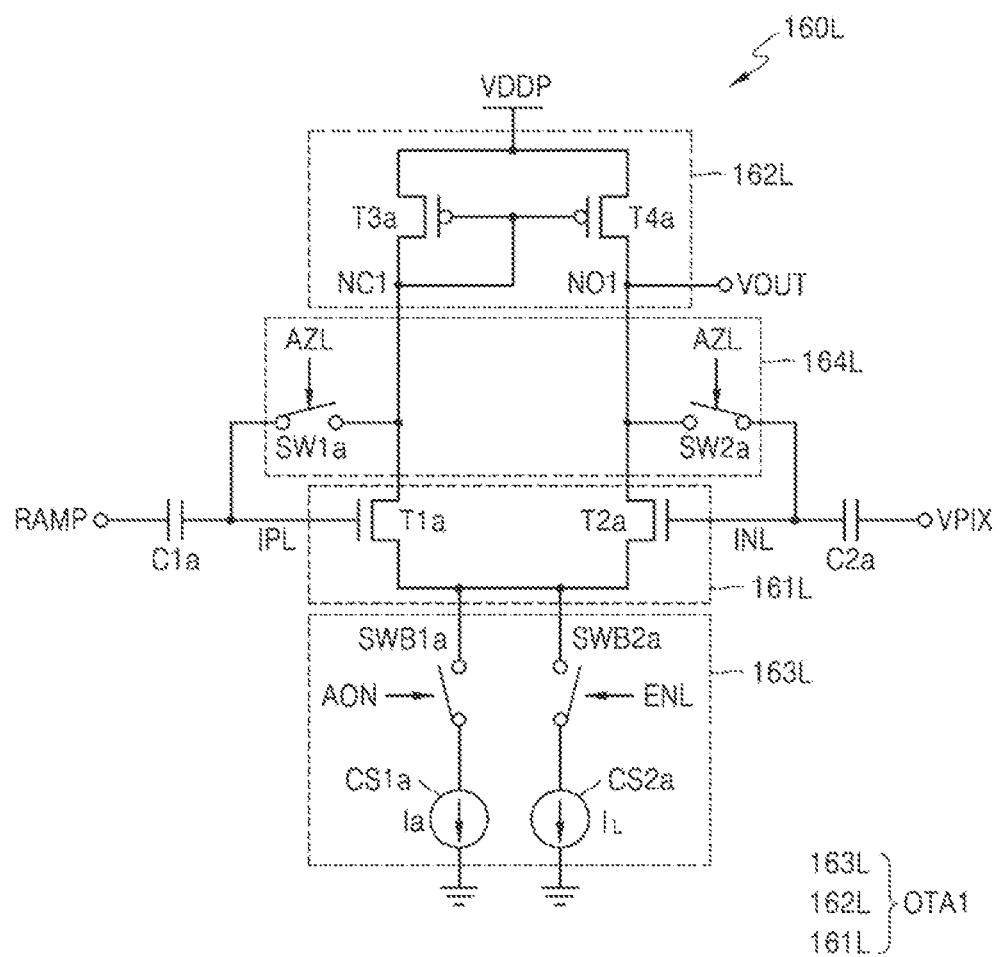
FIGS. 6A and 6B are circuit diagrams of a first comparator and a second comparator according to example embodiments of the inventive concept.
Figure 6B:
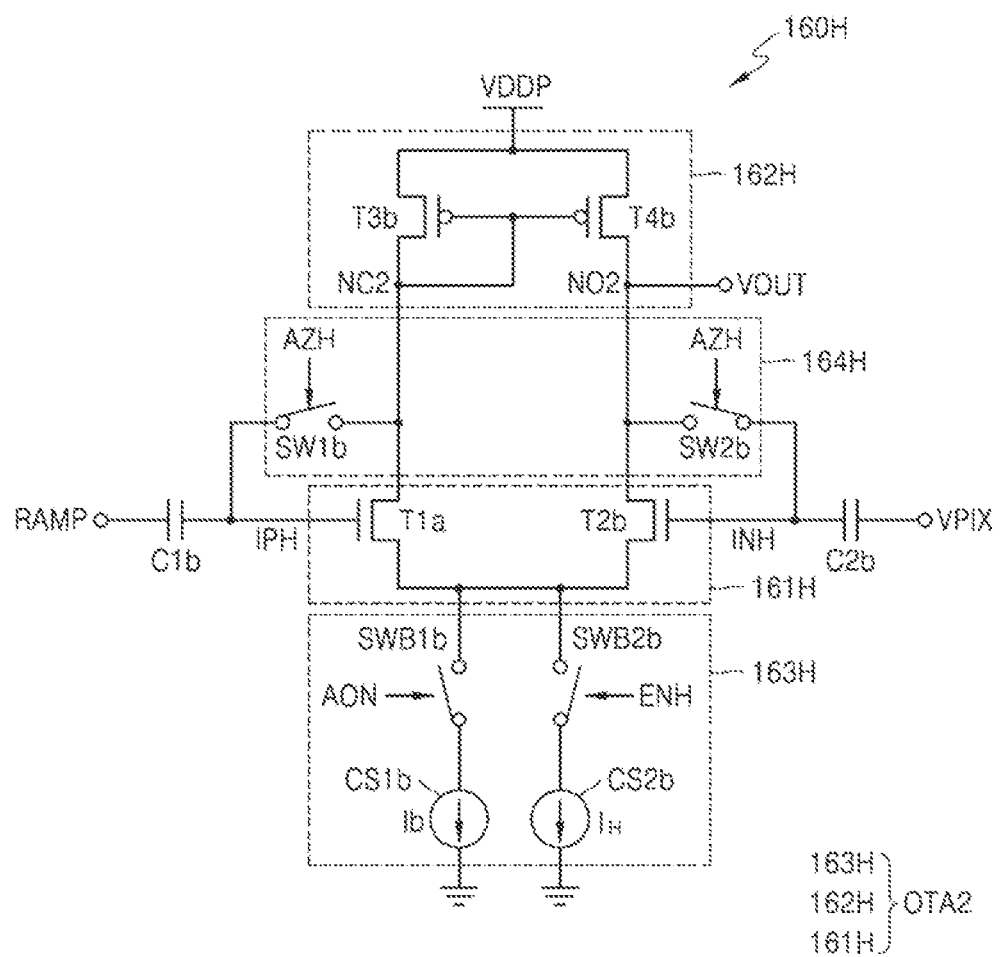

FIGS. 6A and 6B are circuit diagrams of the COMPL 160L and the COMPH 160H according to example embodiments of the inventive concept.

Referring to FIGS. 6A and 6B, the COMPL 160L and the COMPH 160H may be implemented by an OTA.

Referring to FIG. 6A, the COMPL 160L may include an input stage 161L, an output stage 162L, a bias circuit 163L, a switching circuit 164L, and capacitors C1a and C2a. The input stage 161L, the output stage 162L, and the bias circuit 163L may constitute a first OTA OTA1.

The input stage 161L may include transistors T1a and T2a respectively configured to receive the ramp signal RAMP and the pixel voltage VPIX, the capacitor C1a may be connected to a gate terminal of the transistor T1a, and a direct current (DC)-blocked ramp signal RAMP may be applied to the transistor T1a through the capacitor C1a. The capacitor C2a may be connected to a gate terminal of the transistor T2a, and a DC-blocked pixel voltage VPIX may be applied to the transistor T2a through the capacitor C2a. For example, the LCG reset signal and the LCG image signal in the LCG mode may be received as the pixel voltage VPIX.

The output stage 162L may include transistors T3a and T4a and may be implemented by a current mirror. However, the output stage 162L is not limited thereto. A structure of the output stage 162L may be modified.

The switching circuit 164L may include switches SW1a and SW2a turned on in response to a first auto-zero signal AZL. The switches SW1a and SW2a may be turned on in a first auto-zero period before the COMPL 160L performs a comparison operation, so that the gate terminals of the transistors T1a and T2a are connected to an output terminal, i.e., respective source terminals of the transistors T3a and T4a. According to such an auto-zero operation, the COMPL 160L may be initialized, and an offset of the COMPL 160L may be removed. Accordingly, voltage levels of a first input node INL, a second input node IPL, an output node NO1, and a comparison node NC1 in the first OTA OTA1 may be the same, and the same voltage level may be referred to as a first auto-zero level. The first auto-zero level may be determined according to voltage levels of the ramp signal RAMP and the LCG reset signal and an internal offset voltage of the first OTA OTA1. The first input node INL and the second input node IPL may be a positive input node and a negative input node of the first OTA OTA1, respectively, and the comparison node NC1 and the output node NO1 may be a positive output node and a negative output node of the first OTA OTA1, respectively. An output voltage VOUT, e.g., a comparison result signal, may be output from the output node NO1.

The bias circuit 163L may include a first current source CS1a, a second current source CS2a, a first bias switch SWB1a, and a second bias switch SWB2a. A current Ia provided from the first current source CS1a may be lower than a current $I_L$ provided from the second current source CS2a. The first current source CS1a is connected to the input stage 161L through the first bias switch SWB1a, and the second current source CS2a is connected to the input stage 161L through the second bias switch SWB2a.

For example, the first bias switch SWB1a and the second bias switch SWB2a may be implemented by a transistor, e.g., an N-type metal oxide semiconductor (NMOS) transistor, a transmission gate, or the like. The first bias switch SWB1a and the second bias switch SWB2a may have the same size.

Figure 7A:
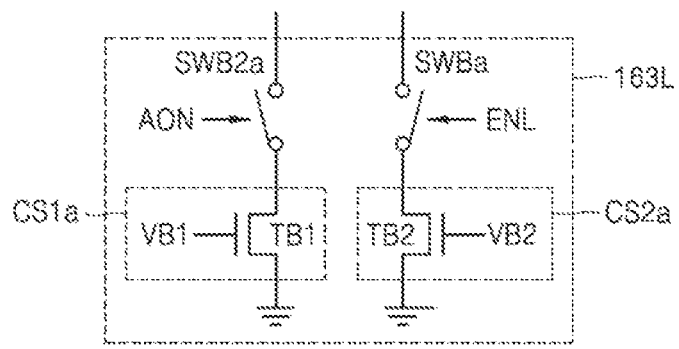
FIGS. 7A and 7B are circuit diagrams of a bias circuit of the first comparator of FIG. 6A, according to example embodiments of the inventive concept.
Figure 7B:
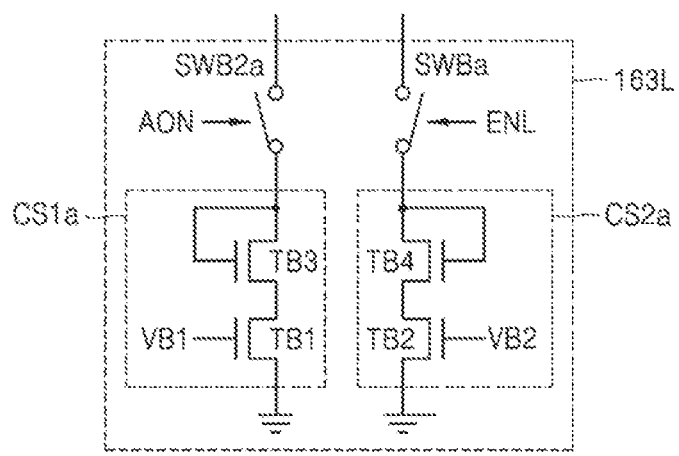

FIGS. 7A and 7B are circuit diagrams of the bias circuit 163L in the COMPL 160L of FIG. 6A, according to example embodiments of the inventive concept.

Referring to FIG. 7A, the first current source CS1a and the second current source CS2a may be implemented by transistors, e.g., a first bias transistor TB1 and a second bias transistor TB2, respectively. The first bias transistor TB1 may generate the current Ia by being controlled by a first bias voltage VB1, and the second bias transistor TB2 may generate the current $I_L$ by being controlled by a second bias voltage VB2. According to an embodiment of the inventive concept, the first bias transistor TB1 and the second bias transistor TB2 may have the same size. The first bias voltage VB1 may be different from the second bias voltage VB2. Accordingly, the current Ia generated by the first current source CS1*a* may be different from the current $I_L$ generated by the second current source CS2*a*.

Referring to FIG. 7B, the first current source CS1*a* may be implemented by a plurality of transistors TB1 and TB3, and the second current source CS2*a* may be implemented by a plurality of transistors TB2 and TB4 Although FIG. 7B shows that each of the first current source CS1*a* and the second current source CS2*a* includes two transistors, each of the first current source CS1*a* and the second current source CS2*a* is not limited thereto and may include three or more transistors.

The plurality of transistors constituting each of the first current source CS1*a* and the second current source CS2*a* may be diode-connected transistors, one of the plurality of transistors, e.g., the first bias transistor TB1 included in the first current source CS1*a*, may be controlled by the first bias voltage VB1, and the second bias transistor TB2 included in the second current source CS2*a* may be controlled by the second bias voltage VB2.

As described above with reference to FIGS. 7A and 7B, the first current source CS1*a* and the second current source CS2*a* may adjust a current amount of a bias current, i.e., the currents Ia and $I_L$, based on a bias voltage, e.g., the first bias voltage VB1 and the second bias voltage VB2, respectively.

Referring back to FIG. 6A, the first bias switch SWB1*a* may be turned on in response to an always on signal AON. The always on signal AON may always have the active level during a readout period. Therefore, the first current source CS1*a* may be connected to the input stage 161L regardless of a conversion mode of the pixel PX. According to an embodiment of the inventive concept, the bias circuit 163L may not include the first bias switch SWB1*a*, and in this case, the first current source CS1*a* may be directly connected to the input stage 161L.

The second bias switch SWB2*a* may be turn on or off in response to the first enable signal ENL. The first enable signal ENL may have the active level (e.g., logic high) when the pixel PX operates in the LCG mode and have the inactive level (e.g., logic low) when the pixel PX operates in the HCG mode. Accordingly, in the LCG mode, a bias current provided from the bias circuit 163L may be Ia+$I_L$, and in the HCG mode, a bias current provided from the bias circuit 163L may be Ia that is lower than the bias current provided in the LCG mode.

As described above with reference to FIGS. 4 and 5, in the LCG mode, the COMPL 160L may receive pixel signals according to the LCG mode and perform a comparison operation, and in the HCG mode, the COMPL 160L may not receive pixel signals. In other words, in the HCG mode, the COMPL 160L may not perform a comparison operation and may be in a standby state. Therefore, according to a mode, the bias current of the bias circuit 163L may be adjusted, and in the HCG mode, the first bias switch SWB1*a* may be turned off and accordingly, the bias current may decrease. Accordingly, power consumption of the COMPL 160L may be reduced. However, when the bias current is blocked in the HCG mode, a settling time for the COMPL 160L to normally operate may need to be long when the HCG mode is switched to the LCG mode. Therefore, the first current source CS1*a* may provide the current Ia even in the HCG mode so that the COMPL 160L may maintain the standby state from which the COMPL 160L may quickly return to a normal operation state in which a comparison operation is performed.

Referring to FIG. 6B, the COMPH 160H may include an input stage 161H, an output stage 162H, a bias circuit 163H, a switching circuit 164H, and capacitors C1*b* and C2*b*. The input stage 161H, the output stage 162H, and the bias circuit 163H may constitute a second OTA OTA2. A structure of the COMPH 160H is similar to a structure of the COMPL 160L. However, a bias current, e.g., Ib and $I_H$, of the bias circuit 163H may be different from the bias current, e.g., Ia and $I_L$, of the bias circuit 163L in the COMPL 160L.

The input stage 161H may include transistors T1*b* and T2*b* respectively configured to receive the ramp signal RAMP and the pixel voltage VPIX, the capacitor C1*b* may be connected to a gate terminal of the transistor T1*b*, and a DC-blocked ramp signal RAMP may be applied to the transistor T1*b* through the capacitor C1*b*. The capacitor C2*b* may be connected to a gate terminal of the transistor T2*b*, and a DC-blocked pixel voltage VPIX may be applied to the transistor T2*b* through the capacitor C2*b*. For example, a first reset signal and a first image signal in the HCG mode may be received as the pixel voltage VPIX.

The output stage 162H may include transistors T3*b* and T4*b* and may be implemented by a current mirror. However, the output stage 162H is not limited thereto. A structure of the output stage 162H may be modified.

The switching circuit 164H may include switches SW1*b* and SW2*b* turned on in response to a second auto-zero signal AZH. The switches SW1*b* and SW2*b* may be turned on in a second auto-zero period before the COMPH 160H performs a comparison operation, so that the gate terminals of the transistors T1*b* and T2*b* are connected to an output terminal, i.e., respective source terminals of the transistors T3*b* and T4*b*. Accordingly, voltage levels of a first input node INH, a second input node IPH, an output node NO2, and a comparison node NC2 in the second OTA OTA2 may be the same, and the same voltage level may be referred to as a second auto-zero level. The second auto-zero level may be determined according to voltage levels of the ramp signal RAMP and the HCG reset signal and an internal offset voltage of the second OTA OTA2.

The bias circuit 163H may include a first current source CS1*b*, a second current source CS2*b*, a first bias switch SWB1*b*, and a second bias switch SWB2*b*. The current Ib provided from the first current source CS1*b* may be lower than the current $I_H$ provided from the second current source CS2*b*. The first current source CS1*b* and the second current source CS2*b* may be implemented similarly to the bias circuit 163L described with reference to FIG. 6A, and at least one transistor provided to each of the first current source CS1*b* and the second current source CS2*b* may be controlled by a bias voltage applied to a gate terminal of the at least one transistor so that a bias current, e.g., the currents Ib and $I_H$, may be adjusted.

The first current source CS1*b* is connected to the input stage 161H through the first bias switch SWB1*b*, and the second current source CS2*b* is connected to the input stage 161H through the second bias switch SWB2*b*.

The first bias switch SWB1*b* may be always turned on during a readout period in response to the always on signal AON. According to an embodiment of the inventive concept, the bias circuit 163H may not include the first bias switch SWB1*b*, and in this case, the first current source CS1*b* may be directly connected to the input stage 161H.

The second bias switch SWB2*b* may be turn on in response to the second enable signal ENH. For example, the second enable signal ENH may have the active level (e.g., logic high) in the HCG mode and have the inactive level (e.g., logic low) in the LCG mode. Accordingly, in the HCG mode, a bias current provided from the bias circuit 163H may be Ib+$I_H$, and in the LCG mode, a bias current provided from the bias circuit 163H may be Ib that is lower than the bias current provided in the HCG mode.

As described above with reference to FIGS. 4 and 5, in the HCG mode, the COMPH 160H may receive pixel signals according to the HCG mode and perform a comparison operation, and in the LCG mode, the COMPH 160H may not receive pixel signals. In other words, in the LCG mode, the COMPH 160H may not perform a comparison operation and may be in the standby state. Therefore, according to a mode, the bias current of the bias circuit 163H may be adjusted, and in the LCG mode, the second bias switch SWB2b may be turned off and accordingly, the bias current may decrease. Accordingly, power consumption of the COMPH 160H may be reduced. However, when the bias current is blocked in the LCG mode, a settling time for the COMPH 160H to normally operate may need to be long when the LCG mode is switched to the HCG mode. Therefore, the first current source CS1b may provide the current Ib even in the LCG mode so that the COMPH 160H may maintain the standby state from which the COMPH 160H may quickly return to the normal operation state in which a comparison operation is performed.

As described above with reference to FIGS. 6A and 6B, a bias current may decrease during a period during which each of the COMPL 160L and the COMPH 160H does not perform a comparison operation. When the COMPL 160L performs a comparison operation, the bias current of the COMPH 160H may decrease, and when the COMPH 160H performs a comparison operation, the bias current of the COMPL 160L may decrease. Accordingly, power consumption of the CDS circuit 160 including the COMPL 160L and the COMPH 160H may be reduced even when a comparison operation of pixel voltages output from the pixel PX is normally performed. In addition, power consumption of the image sensor 100 (of FIG. 1) including the plurality of CDS circuits 160 may be reduced.

Figure 8:
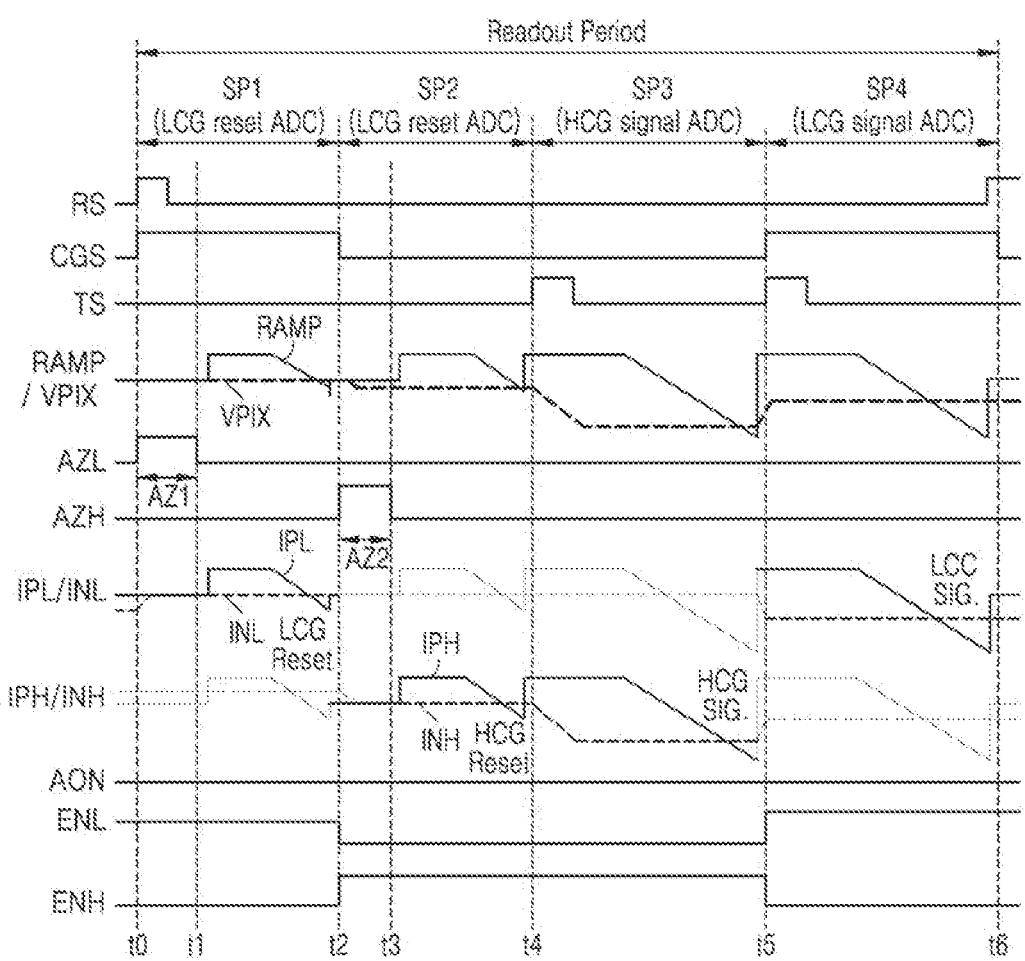
FIG. 8 is a timing diagram illustrating an operating method of an image sensor, according to an example embodiment of the inventive concept.

FIG. 8 is a timing diagram illustrating an operating method of an image sensor, according to an example embodiment of the inventive concept. FIG. 8 illustrates an operation of the pixel PX of FIG. 2, the CDS circuit 160 of FIG. 4, and the COMPL 160L and the COMPH 160H of FIGS. 6A and 6B. Control signals, e.g., the reset control signal RS, the gain control transistor CGX, and the transport control signal TS, provided to the pixel PX may be received from the row driver 120, control signals, e.g., the always on signal AON, the first enable signal ENL, the second enable signal ENH, the first auto-zero signal AZL, and the second auto-zero signal AZH, provided to the CDS circuit 160 may be provided from the timing controller 190.

As described above with reference to FIG. 3, signals may be read from the pixel PX according to the RRSS read scheme during a readout period.

During the first sub-period SP1, the first enable signal ENL may have the active level, e.g., logic high, and the second enable signal ENH may have the inactive level, e.g., logic low.

Referring to FIG. 4, the first input switch SWI1 may be turned on in response to the first enable signal ENL, and the pixel voltage VPIX may be applied to the COMPL 160L. The COMPL 160L may perform a comparison operation. In response to the active level of the always on signal AON and the first enable signal ENL, the first and second bias switches SWB1a and SWB2a in the COMPL 160L may be turned on, and the COMPL 160L may operate based on the bias current Ia+I$_L$. In response to the active level of the always on signal AON and the inactive level of the second enable signal ENH, the first bias switch SWB1b in the COMPH 160H may be turned on, the second bias switch SWB2b may be turned off, and the COMPH 160H may operate based on the bias current Ib. For example, the COMPH 160H may be in the standby state.

During a readout period, the always on signal AON may always have the active level, and the first bias switch SWB1a in the COMPL 160L and the first bias switch SWB1b in the COMPH 160H may continuously maintain the turn-on state like during the first sub-period SP1. Therefore, hereinafter, a description of the first bias switch SWB1a in the COMPL 160L and the first bias switch SWB1b in the COMPH 160H may be omitted.

A period from a time point t0 to a time point t1 indicates a first auto-zero period AZ1, and the first auto-zero signal AZL may have the active level during the first auto-zero period AZ1. In response to the first auto-zero signal AZL, the first OTA OTA1 in the COMPL 160L may perform an auto-zero operation. Levels of the first input node INL and the second input node IPL in the first OTA OTA1 may be the same as the first auto-zero level. Thereafter, the levels of the first input node INL and the second input node IPL in the first OTA OTA1 may vary according to a level change in the pixel voltage VPIX and the ramp signal RAMP. Accordingly, from the time point t1 to a time point t2, the COMPL 160L may compare the LCG reset signal received as the pixel voltage VPIX with the ramp signal RAMP and output a comparison result signal according to the comparison result.

During the second sub-period SP2 and the third sub-period SP3, the first enable signal ENL may have the inactive level, e.g., logic low, and the second enable signal ENH may have the active level, e.g., logic high. Referring to FIG. 4, the second input switch SWI2 may be turned on in response to the second enable signal ENH, and the pixel voltage VPIX may be applied to the COMPH 160H. The COMPH 160H may perform a comparison operation. In response to the active level of the second enable signal ENH, the second bias switch SWB2b in the COMPH 160H may be turned on, and the COMPH 160H may operate based on the bias current Ib+I$_H$. In response to the inactive level of the first enable signal ENL, the second bias switch SWB2a in the COMPL 160L may be turned off, and the COMPL 160L may operate based on the bias current Ia. For example, the COMPL 160L may be in the standby state.

A period from the time point t2 to a time point t3 indicates a second auto-zero period AZ2, and the second auto-zero signal AZH may have the active level during the second auto-zero period AZ2. In response to the second auto-zero signal AZH, the second OTA OTA2 in the COMPH 160H may perform an auto-zero operation. Levels of the first input node INH and the second input node IPH in the second OTA OTA2 may be the same as the second auto-zero level. Thereafter, the levels of the first input node INH and the second input node IPH in the second OTA OTA2 may vary according to a level change in the pixel voltage VPIX and the ramp signal RAMP. Accordingly, from the time point t3 to a time point t4, the COMPH 160H may compare the HCG reset signal received as the pixel voltage VPIX with the ramp signal RAMP and output a comparison result signal according to the comparison result. In addition, during the third sub-period SP3, i.e., from the time point t4 to a time point t5, the COMPH 160H may compare the HCG image signal (e.g., the HCG signal voltage) received as the pixel voltage VPIX with the ramp signal RAMP and output a comparison result signal according to the comparison result.

During the fourth sub-period SP4, the first enable signal ENL may have the active level, e.g., logic high, and the second enable signal ENH may have the inactive level, e.g., logic low. Referring to FIG. 4, the first input switch SWI1 may be turned on in response to the first enable signal ENL, and the pixel voltage VPIX may be applied to the COMPL 160L. The COMPL 160L may perform a comparison operation. Like during the first sub-period SP1, in response to the active level of the first enable signal ENL, the second bias switch SWB2a in the COMPL 160L may be turned on, and the COMPL 160L may operate based on the bias current Ia+$I_L$. In response to the inactive level of the second enable signal ENH, the second bias switch SWB2b in the COMPH 160H may be turned off, and the COMPH 160H may operate based on the bias current Ib.

As described above, the COMPL 160L may perform comparison operations based on the LCG reset signal and the LCG image signal during the first sub-period SP1 and the fourth sub-period SP4, respectively, and the COMPH 160H may perform comparison operations based on the HCG reset signal and the HCG image signal during the second sub-period SP2 and the third sub-period SP3, respectively. The COMPL 160L may have a reduced bias current during the second sub-period SP2 and the third sub-period SP3 during which no comparison operation is performed, and the COMPH 160H may have a reduced bias current during the first sub-period SP1 and the fourth sub-period SP4 during which no comparison operation is performed.

For example, assuming that the bias current Ib and $I_H$ of the COMPH 160H are the same as the bias current Ia and $I_L$ of the COMPL 160L, when the bias currents of the COMPL 160L and the COMPH 160H are not adjusted according to the conversion gain mode, a total bias current of the CDS circuit 160 during a readout period is 2×(Ia+$I_L$). However, in the CDS circuit 160 according to an embodiment of the inventive concept, a total bias current of the CDS circuit 160 during a readout period is 2×Ia+$I_L$. Therefore, power consumption of the CDS circuit 160 and the image sensor 100 may be reduced.

Figure 9A:
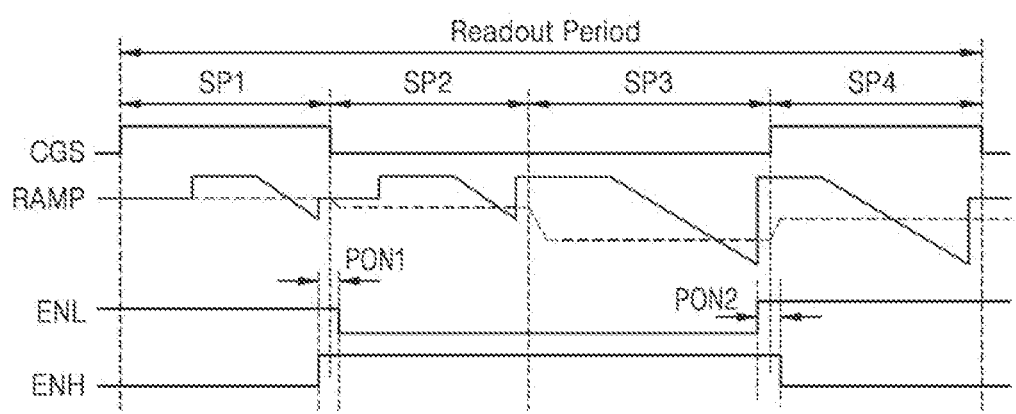
FIGS. 9A and 9B are timing diagrams illustrating a bias current control method of a first comparator and a second comparator in a CDS circuit, according to example embodiments of the inventive concept.
Figure 9B:
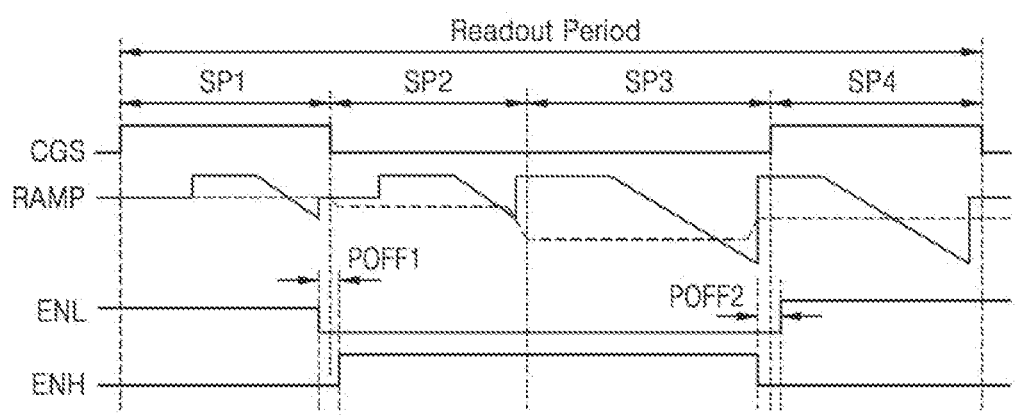

FIGS. 9A and 9B are timing diagrams illustrating a bias current control method of a first comparator and a second comparator in a CDS circuit, according to example embodiments of the inventive concept.

Referring to FIGS. 9A and 9B, the levels of the first enable signal ENL and the second enable signal ENH may transition from the active level to the inactive level or from the inactive level to the active level according to level transition of the gain control signal CGS. In this case, as shown in FIG. 9A, both the first enable signal ENL and the second enable signal ENH may have the active level during partial periods, e.g., a period PON1 and a period PON2, before and after a level transition time point of the gain control signal CGS. Accordingly, the bias current of the COMPL 160L may decrease after the bias current of the COMPH 160H increases during the first sub-period SP1 and the second sub-period SP2, and the bias current of the COMPH 160H may decrease after the bias current of the COMPL 160L increases during the third sub-period SP3 and the fourth sub-period SP4.

On the contrary, as shown in FIG. 9B, both the first enable signal ENL and the second enable signal ENH may have the inactive level during partial periods, e.g., a period POFF1 and a period POFF2, before and after a level transition time point of the gain control signal CGS. Accordingly, the bias current of the COMPH 160H may increase after the bias current of the COMPL 160L decreases during the first sub-period SP1 and the second sub-period SP2, and the bias current of the COMPL 160L may increase after the bias current of the COMPH 160H decreases during the third sub-period SP3 and the fourth sub-period SP4.

Figure 10:
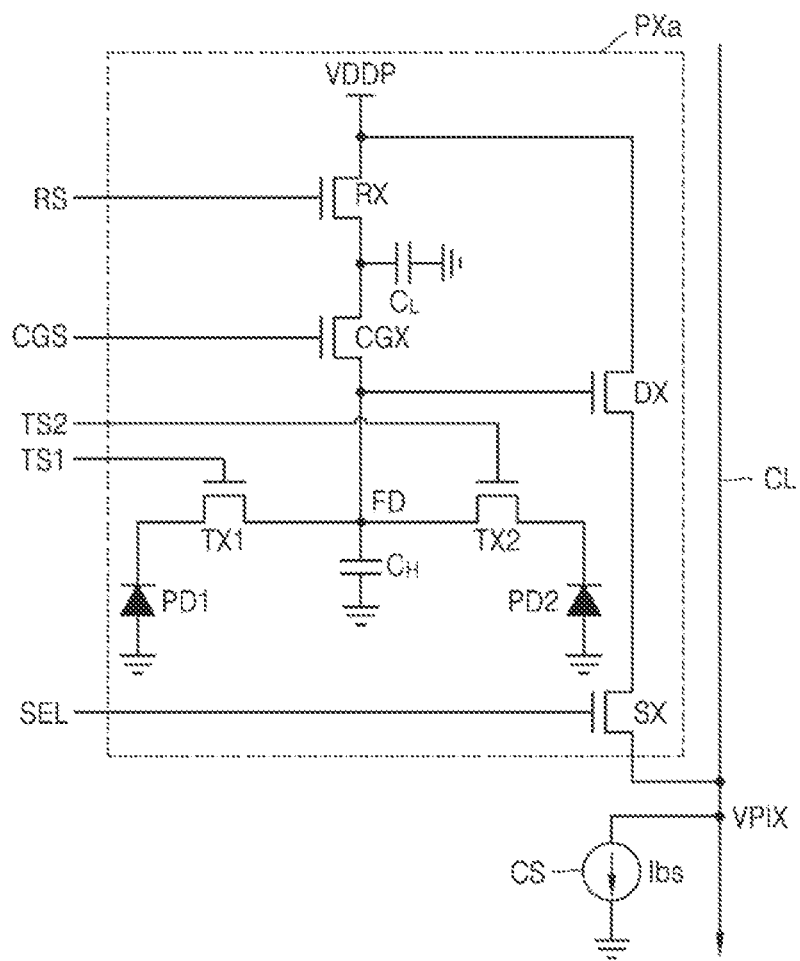
FIG. 10 is a circuit diagram of a pixel according to an example embodiment of the inventive concept.

FIG. 10 is a circuit diagram of a pixel PXa according to an example embodiment of the inventive concept. The pixel PXa of FIG. 10 is a modified example of the pixel PX of FIG. 2.

Referring to FIG. 10, the pixel PXa may include two photodiodes, e.g., first and second photodiodes PD1 and PD2, a plurality of transistors, e.g., first and second transport transistors TX1 and TX2, the reset transistor RX, the driving transistor DX, the select transistor SX, the gain control transistor (or the conversion gain control transistor) CGX, and the capacitor $C_L$. Herein, the first and second photodiodes PD1 and PD2 are disposed under one microlens.

The first photodiode PD1, the first transport transistor TX1, the second photodiode PD2, and the second transport transistor TX2 may share the floating diffusion node FD. The first transport transistor TX1 may be turned on in response to a first transport control signal TS1 so that charges generated by the first photodiode PD1 are transported to the floating diffusion node FD. The second transport transistor TX2 may be turned on in response to a second transport control signal TS2 so that charges generated by the second photodiode PD2 are transported to the floating diffusion node FD. The first transport transistor TX1 and the second transport transistor TX2 may independently operate in response to the first transport control signal TS1 and the second transport control signal TS2, respectively.

Figure 11A:
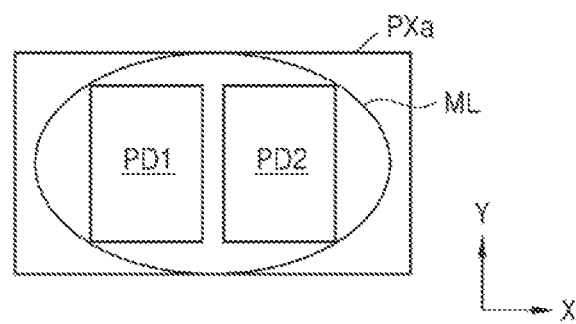
FIG. 11A is a top view of a pixel according to an example embodiment of the inventive concept.
Figure 11B:
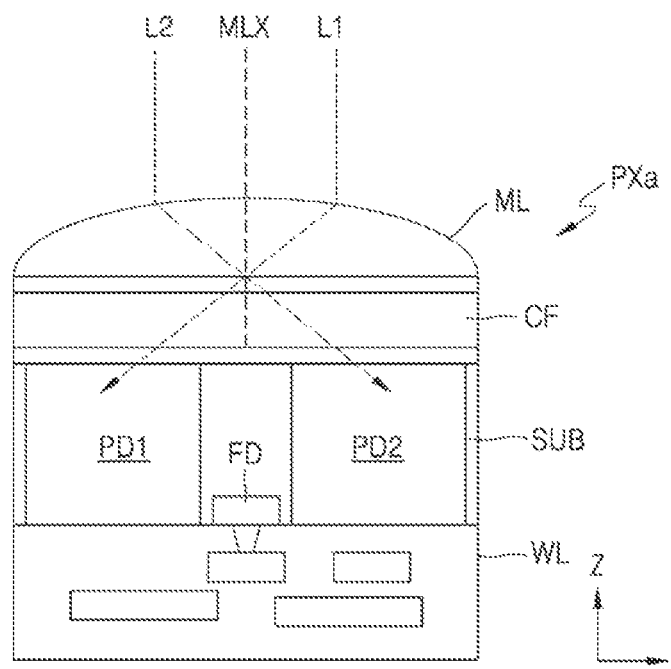
FIG. 11B is a vertical cross-sectional view of the pixel of FIG. 11A.

FIG. 11A is a top view of the pixel PXa according to an example embodiment of the inventive concept, and FIG. 11B is a vertical cross-sectional view of the pixel PXa of FIG. 11A.

Referring to FIGS. 11A and 11B, the pixel PXa may include a microlens ML, a color filter CF, the first and second photodiodes PD1 and PD2, the floating diffusion node FD, and a wiring layer WL.

The color filter CF may be under the microlens ML, and the first and second photodiodes PD1 and PD2 may be under the color filter CF. The first and second photodiodes PD1 and PD2 may be formed on a substrate SUB, and the floating diffusion node FD may also be formed on the substrate SUB. Transistors, e.g., the first and second transport transistors TX1 and TX2, the reset transistor RX, the driving transistor DX, the select transistor SX, and the gain control transistor CGX, may be formed on the substrate SUB, and wirings connecting the transistors and row lines for carrying control signals of the transistors may be formed on the wiring layer WL.

According to the present embodiment, the first and second photodiodes PD1 and PD2 may be disposed side by side under the microlens ML. The first and second photodiodes PD1 and PD2 may be respectively disposed to the left/right (or top/bottom) around an optical axis MLX of the microlens ML. The first photodiode PD1 may receive a first optical signal L1 collected through the right side of the optical axis MLX, and the second photodiode PD2 may receive a second optical signal L2 collected through the left side of the optical axis MLX.

The image sensor 100 may generate autofocus data for autofocusing of an image capturing device, and the pixel PXa of FIGS. 11A and 11B may be a focusing pixel configured to generate autofocus data. For example, the focusing pixel may be disposed between the plurality of pixels PX in the pixel array 110. Alternatively, all of the plurality of pixels PX in the pixel array 110 may be implemented by the focusing pixel so that the plurality of pixels PX generate autofocus data.

Figure 12:
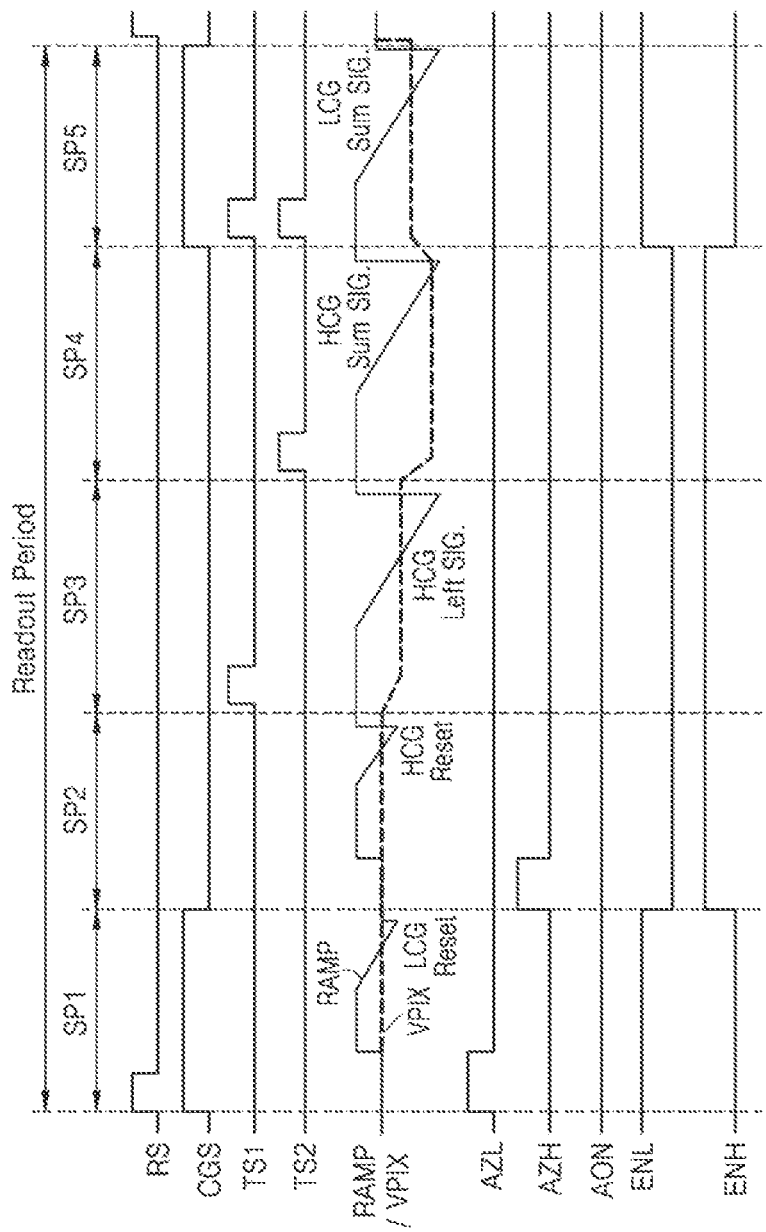
FIG. 12 is a timing diagram illustrating an operating method of an image sensor, according to an example embodiment of the inventive concept.

FIG. 12 is a timing diagram illustrating an operating method of an image sensor, according to an example embodiment of the inventive concept. FIG. 12 illustrates an operation of the pixel PXa of FIG. 10, the CDS circuit 160 of FIG. 4, and the COMPL 160L and the COMPH 160H of FIGS. 6A and 6B.

Referring to FIG. 12, a readout period of the pixel PXa may include first to fifth sub-periods SP1 to SP5. During the first sub-period SP1, the LCG reset signal may be read, during the second sub-period SP2, the HCG reset signal may be read, during the third sub-period SP3, an HCG left image signal (or an HCG right image signal) may be read, during the fourth sub-period SP4, an HCG sum image signal may be read, and during the fifth sub-period SP5, an LCG sum image signal may be read. Herein, a left image signal indicates an image signal generated based on charges generated by the first photodiode PD1 in the pixel PXa, and a sum image signal indicates an image signal generated based on charges generated by the first and second photodiodes PD1 and PD2 in the pixel PXa.

An operation during the first and second sub-periods SP1 and SP2 is the same as an operation during the first and second sub-periods SP1 and SP2 of FIG. 8, and thus, a duplicated description may be omitted.

During the third sub-period SP3, the pixel PXa operates in the HCG mode in response to the inactive level of the gain control signal CGS. The first transport control signal TS1 may be toggled to the active level, and charges generated by the first photodiode PD1 may be transported to and stored at the floating diffusion node FD. Accordingly, the HCG left image signal (e.g., an HCG left signal voltage) may be read.

During the fourth sub-period SP4, the second transport control signal TS2 may be toggled to the active level, and charges generated by the second photodiode PD2 may be transported to and stored at the floating diffusion node FD. The charges generated by the first and second photodiodes PD1 and PD2 may be stored at the floating diffusion node FD, and accordingly, the HCG sum image signal (e.g., an HCG sum signal voltage) may be read.

During the fifth sub-period SP5, the pixel PXa operates in the LCG mode in response to the active level of the gain control signal CGS. The first transport control signal TS1 and the second transport control signal TS2 may be toggled to the active level, and remaining charges in the first and second photodiodes PD1 and PD2 may be transported to and stored at the floating diffusion node FD. The LCG sum image signal (e.g., an LCG sum signal voltage) according to the voltage of the floating diffusion node FD may be read.

An HCG right image value may be calculated by subtracting a counting value for the HCG left image signal, e.g., an HCG left image value, from a counting value for the HCG sum image signal, e.g., an HCG sum image value. Autofocus data may be generated based on HCG left image values and HCG right image values generated from a plurality of focusing pixels in the pixel array 110.

The COMPL 160L may process LCG signals, e.g., the LCG reset signal and the LCG sum signal, during the first and fifth sub-periods SP1 and SP5, respectively, and the COMPH 160H may process HCG signals, e.g., the HCG reset signal, the HCG left image signal, and the HCG sum signal, during the second to fourth sub-periods SP2 to SP4, respectively. When the COMPL 160L performs a comparison operation during the first and fifth sub-periods SP1 and SP5, the COMPH 160H may be in the standby state, thereby reducing a bias current. In addition, when the COMPH 160H performs a comparison operation during the second to fourth sub-periods SP2 to SP4, the COMPL 160L may be in the standby state, thereby reducing a bias current.

Figure 13A:
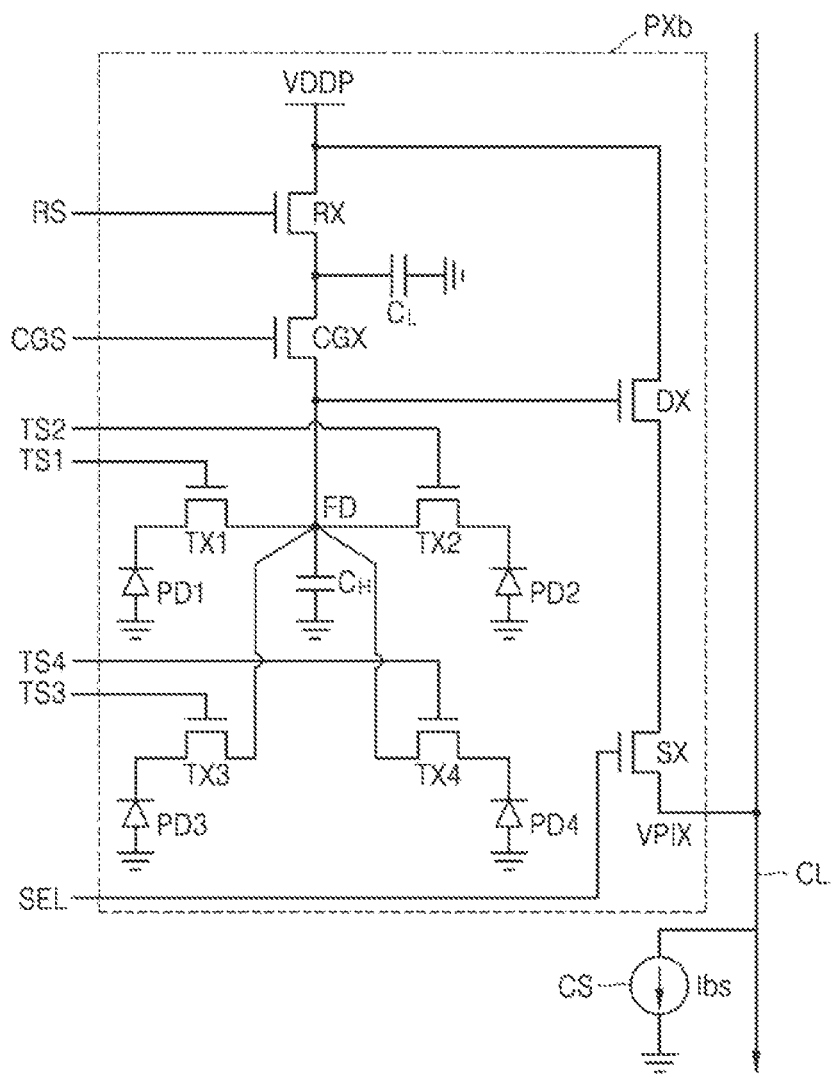
FIG. 13A is a circuit diagram of a pixel according to an example embodiment of the inventive concept.
Figure 13B:
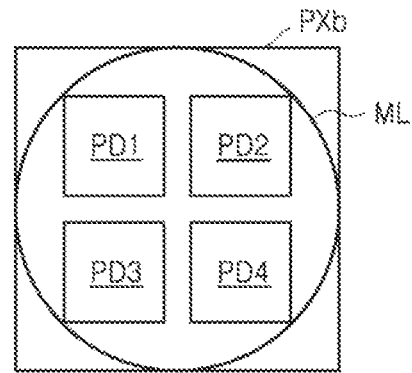
FIG. 13B is a top view of the pixel of FIG. 13A.

FIG. 13A is a circuit diagram of a pixel PXb according to an example embodiment of the inventive concept, and FIG. 13B is a top view of the pixel PXb of FIG. 13A. The pixel PXb of FIG. 13A is a modified example of the pixel PX of FIG. 2.

Referring to FIG. 13A, the pixel PXb may include four photodiodes, e.g., first to fourth photodiodes PD1 to PD4, a plurality of transistors, e.g., first to fourth transport transistors TX1 to TX4, the reset transistor RX, the driving transistor DX, the select transistor SX, the gain control transistor (or the conversion gain control transistor) CGX, and the capacitor $C_L$. Herein, the first to fourth photodiodes PD1 to PD4 are disposed under one microlens.

The first photodiode PD1, the first transport transistor TX1, the second photodiode PD2, the second transport transistor TX2, the third photodiode PD3, the third transport transistor TX3, the fourth photodiode PD4, and the fourth transport transistor TX4 may share the floating diffusion node FD.

The first transport transistor TX1 may be turned on in response to the first transport control signal TS1 so that charges generated by the first photodiode PD1 are transported to the floating diffusion node FD. The second transport transistor TX2 may be turned on in response to the second transport control signal TS2 so that charges generated by the second photodiode PD2 are transported to the floating diffusion node FD. The third transport transistor TX3 may be turned on in response to a third transport control signal TS3 so that charges generated by the third photodiode PD3 are transported to the floating diffusion node FD. The fourth transport transistor TX4 may be turned on in response to a fourth transport control signal TS4 so that charges generated by the fourth photodiode PD4 are transported to the floating diffusion node FD. The first to fourth transport transistors TX1 to TX4 may independently operate in response to the first to fourth transport control signals TS1 to TS4, respectively.

Referring to FIG. 13B, the first to fourth photodiodes PD1 to PD4 may be disposed side by side under the microlens ML. For example, the first and third photodiodes PD1 and PD3 may be disposed at the left side, the second and fourth photodiodes PD2 and PD4 may be disposed at the right side, the first and second photodiodes PD1 and PD2 may be disposed to the top, and the third and fourth photodiodes PD3 and PD4 may be disposed to the bottom. The pixel PXb may operate as a focusing pixel.

All or some of the plurality of pixels PX in the pixel array 110 (of FIG. 1) may be implemented by the pixel PXb. The image sensor 100 may operate as shown in FIG. 12, the first and third transport control signals TS1 and TS3 may be the same as the first transport control signal TS1 of FIG. 12, and the second and fourth transport control signals TS2 and TS4 may be the same as the second transport control signal TS2 of FIG. 12. In this case, the HCG left image signal may be generated based on charges generated by the first and third photodiodes PD1 and PD3, and the HCG sum image signal may be generated based on charges generated by the first to fourth photodiodes PD1 to PD4.

According to an embodiment of the inventive concept, the first and second transport control signals TS1 and TS2 may be the same as the first transport control signal TS1 of FIG. 12, and the third and fourth transport control signals TS3 and TS4 may be the same as the second transport control signal TS2 of FIG. 12 In this case, an HCG top image signal may be generated based on charges generated by the first and second photodiodes PD1 and PD2, and the HCG sum image signal may be generated based on charges generated by the first to fourth photodiodes PD1 to PD4. An HCG bottom image value may be calculated by subtracting a counting value for the HCG top image signal, e.g., an HCG top image value, from a counting value for the HCG sum image signal, e.g., an HCG sum image value. HCG top image values and HCG bottom image values of focusing pixels in the pixel array 110 may be used as autofocus data.

Figure 14:
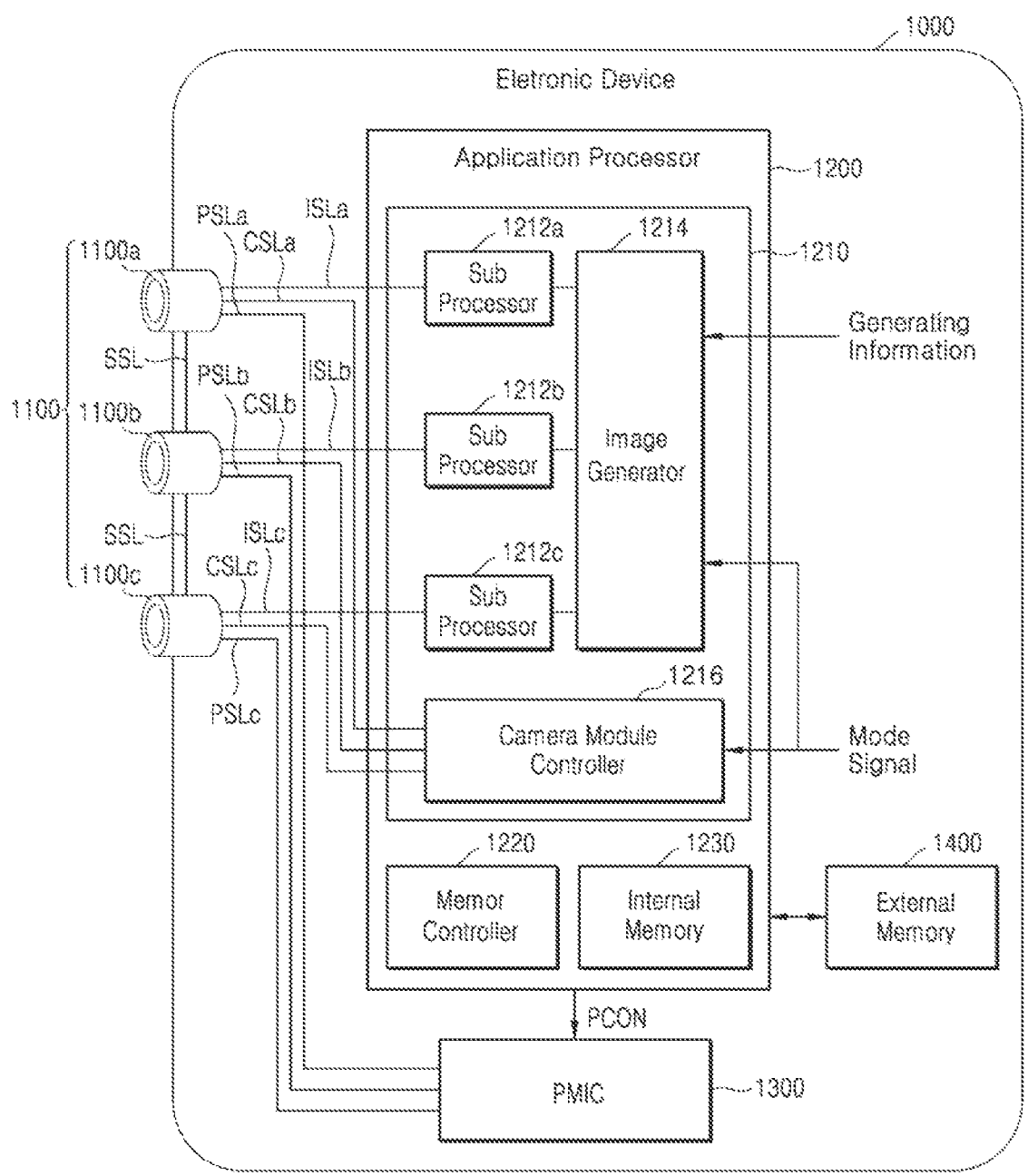
FIGS. 14 and 15 are block diagrams of an electronic device including a multi-camera module.
Figure 15:
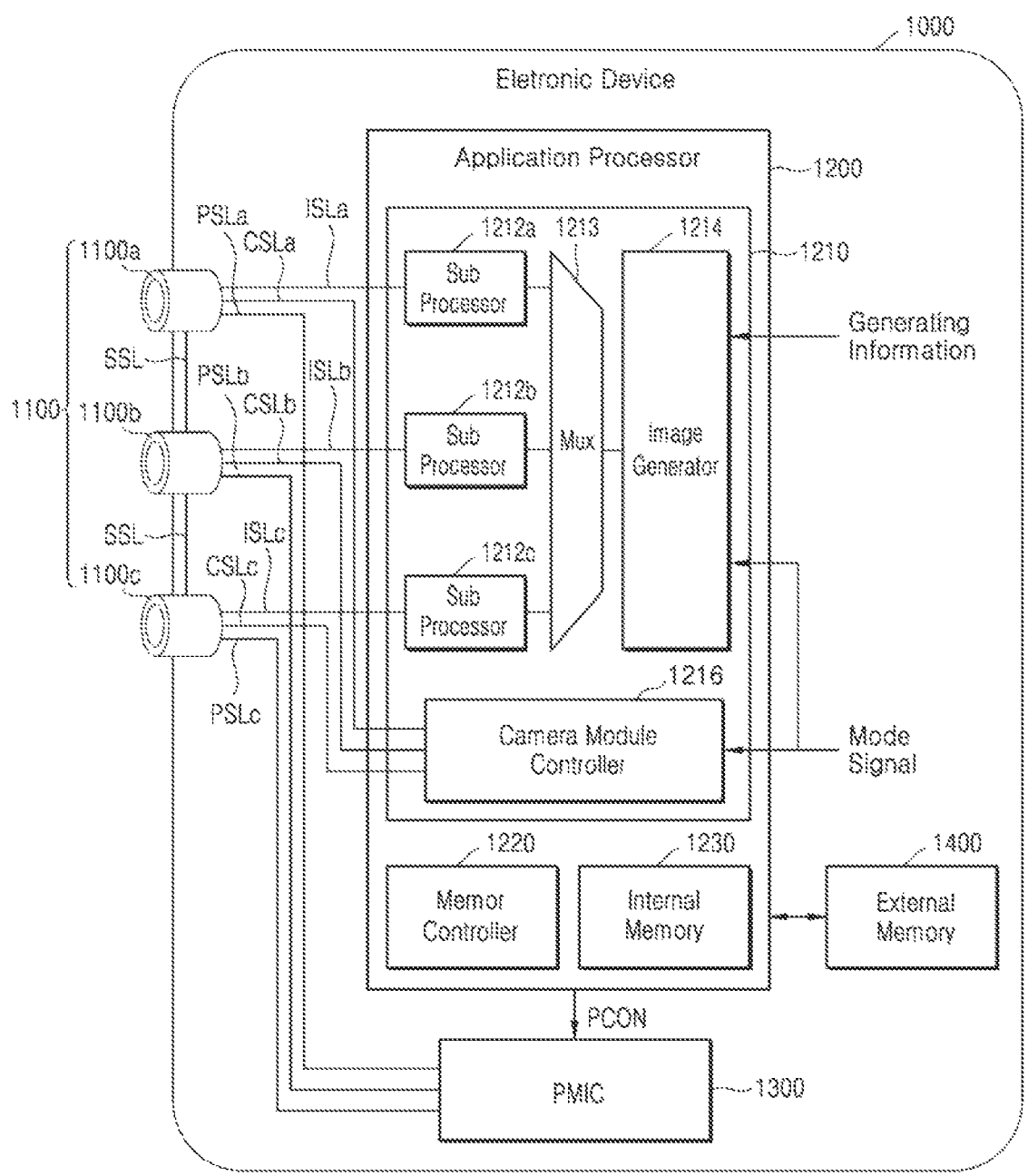
Figure 16:
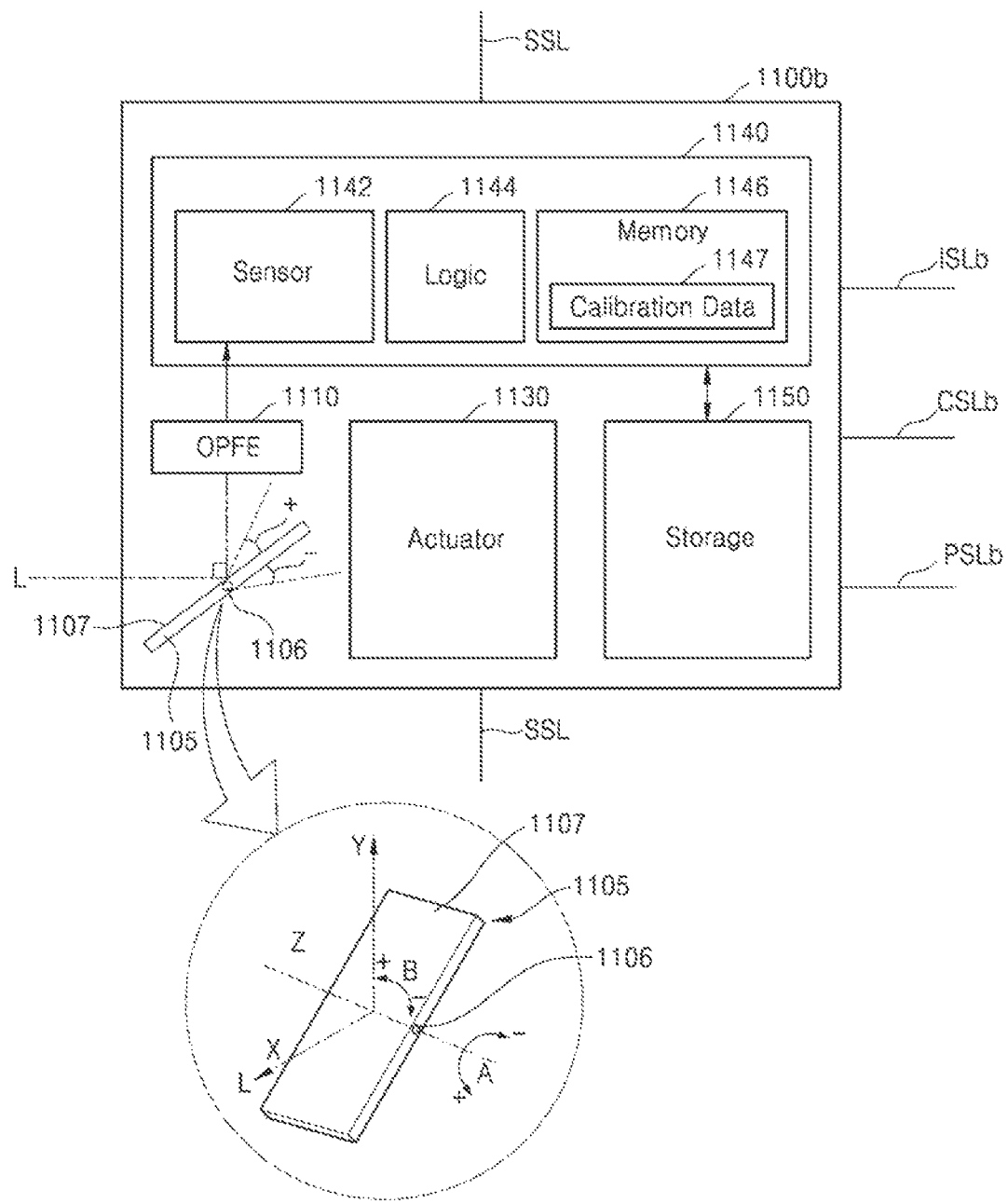
FIG. 16 is a detailed block diagram of a camera module of FIGS. 14 and 15.

FIGS. 14 and 15 are block diagrams of an electronic device 1000 including a multi-camera module. FIG. 16 is a detailed block diagram of a camera module 1100b of FIGS. 14 and 15.

Referring to FIG. 14, the electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although the embodiments in which three camera modules 1100a, 1100b, and 1100c are disposed are shown in FIGS. 14 and 15, the embodiments are not limited thereto. According to some embodiments of the inventive concept, the camera module group 1100 may be modified and include only two camera modules. Alternatively, according to some embodiments of the inventive concept, the camera module group 1100 may be modified and include k camera modules (k is a natural number of 4 or more).

Hereinafter, a detailed configuration of the camera module 1100b will be described in more detail with reference to FIG. 16, but a description made below may also be applied to the other camera modules 1100a and 1100c.

Referring to FIG. 16, the camera module 1100b may include a prism 1105, an optical path folding element (OPFE) 1110, an actuator 1130, an image sensing device 1140, and a storage 1150.

The prism 1105 may include a reflective surface 1107 of a light-reflective material and change a path of light L incident from the outside.

According to some embodiments of the inventive concept, the prism 1105 may change a path of the light L incident in a first direction X into a second direction Y that is perpendicular to the first direction X. In more detail, the prism 1105 may change the path of the light L incident in the first direction X into the second direction Y that is perpendicular to the first direction X by rotating the reflective surface 1107 of a light-reflective material in an A direction around a central axis 1106 or rotating the central axis 1106 in a B direction. In this case, the OPFE 1110 may also move in a third direction Z that is perpendicular to the first direction X and the second direction Y According to some embodiments of the inventive concept, as shown in FIG. 16, a maximum rotating angle of the prism 1105 in the direction A may be less than or equal to 15 degrees in a plus (+) A direction and greater than 15 degrees in a minus (−) A direction, but the embodiments are not limited thereto.

According to some embodiments of the inventive concept, the prism 1105 may rotate by around 20 degrees, around 10 degrees to around 20 degrees, or around 15 degrees to around 20 degrees in a + or − B direction, wherein the rotating angle may be the same or almost similar within a range of around one degree in the +or − B direction.

According to some embodiments of the inventive concept, the reflective surface 1107 of a light-reflective material in the prism 1105 may be moved in the third direction Z that is parallel to an extension direction of the central axis 1106.

The OPFE 1110 may include, for example, a group of m optical lenses (m is a natural number). The m optical lenses may move in the second direction Y so that an optical zoom ratio of the camera module 1100b is changed. For example, assuming that a default optical zoom ratio of the camera module 1100b is Z, when them optical lenses included in the OPFE 1110 are moved, the optical zoom ratio of the camera module 1100b may be changed to 3Z, 5Z, or more.

The actuator 1130 may move the OPFE 1110 or the optical lens group (hereinafter, referred to as an optical lens) to a position. For example, the actuator 1130 may adjust, for accurate sensing, a position of the optical lens so that an image sensor 1142 is located at a focal length of the optical lens.

The image sensing device 1140 may include the image sensor 1142, a control logic 1144, and a memory 1146. The image sensor 1142 may sense an image of an object to be sensed by using the light L provided through the optical lens. The image sensor 100 and components thereof, e.g., the pixel PX (of FIG. 2) supporting the dual conversion gain and the CDS circuit 160 (of FIG. 4), which have been described with respect to FIGS. 1 to 13B, may be applied to the image sensor 1142. The image sensor 1142 may generate image data having the HDR by merging HCG image data and LCG image data.

The control logic 1144 may control an operation of the camera module 1100b. For example, the control logic 1144 may control an operation of the camera module 1100b in response to a control signal provided through a control signal line CSLb.

The memory 1146 may store information, such as calibration data 1147, for an operation of the camera module 1100b. The calibration data 1147 may include information for the camera module 1100b to generate image data by using the light L provided from the outside. The calibration data 1147 may include, for example, information about a degree of rotation, information about a focal length, information about an optical axis, and the like described above. When the camera module 1100b is implemented in a form of a multi-state camera of which a focal length varies depending on a position of the optical lens, the calibration data 1147 may include position-based (or state-based) focal length values of the optical lens and information related to autofocusing.

The storage 1150 may store image data sensed through the image sensor 1142. The storage 1150 may be disposed outside the image sensing device 1140 and implemented in a stacked form with a sensor chip constituting the image sensing device 1140.

According to some embodiments of the inventive concept, the storage 1150 may be implemented by electrically erasable programmable read-only memory (EEPROM), but the embodiments are not limited thereto. According to some embodiments of the inventive concept, the image sensor 1142 may include a pixel array, and the control logic 1144 may include an analog to digital converter and an image signal processor configured to process a sensed image.

Referring to FIGS. 14 and 16, according to some embodiments of the inventive concept, each of the plurality of camera modules 1100a, 1100b, and 1100c may include the actuator 1130. Accordingly, each of the plurality of camera modules 1100a, 1100b, and 1100c may include the same or different calibration data 1147 according to an operation of the actuator 1130 included therein.

According to some embodiments of the inventive concept, one camera module (e.g., 1100b) among the plurality of camera modules 1100a, 1100b, and 1100c may be a folded lens-type camera module including the prism 1105 and the OPFE 1110 described above, and the other camera modules (e.g., 1100*a* and 1100*c*) may be vertical-type camera modules without including the prism 1105 and the OPFE 1110, but the embodiments are not limited thereto.

According to some embodiments of the inventive concept, one camera module (e.g., 1100*c*) among the plurality of camera modules 1100*a*, 1100*b*, and 1100*c* may be a vertical-type depth camera configured to extract depth information by using, for example, infrared rays (IR). In this case, the application processor 1200 may generate a three-dimensional (3D) depth image by merging image data received from the depth camera and image data received from another camera module (e.g., 1100*a* or 1100*b*).

According to some embodiments of the inventive concept, at least two camera modules (e.g., 1100*a* and 1100*b*) among the plurality of camera modules 1100*a*, 1100*b*, and 1100*c* may have different fields of view. In this case, for example, optical lenses in the at least two camera modules (e.g., 1100*a* and 1100*b*) among the plurality of camera modules 1100*a*, 1100*b*, and 1100*c* may be different from each other, but the embodiments are not limited thereto.

Alternatively, according to some embodiments of the inventive concept, the plurality of camera modules 1100*a*, 1100*b*, and 1100*c* may have different fields of view. For example, the camera module 1100*a* may be an ultrawide camera, the camera module 1100*b* may be a wide camera, and the camera module 1100*c* may be a tele-camera, but the embodiments are not limited thereto. In this case, optical lenses respectively included in the plurality of camera modules 1100*a*, 1100*b*, and 1100*c* may also be different from each other, but the embodiments are not limited thereto.

Alternatively, according to some embodiments of the inventive concept, the plurality of camera modules 1100*a*, 1100*b*, and 1100*c* may be physically separated. That is, instead that a sensing region of one image sensor 1142 is divided so that the divided sensing regions are respectively used by the plurality of camera modules 1100*a*, 1100*b*, and 1100*c*, the image sensor 1142 may be independently included in each of the plurality of camera modules 1100*a*, 1100*b*, and 1100*c*.

Referring back to FIG. 14, the application processor 1200 may include an image processor 1210, a memory controller 1220, and an internal memory 1230. The application processor 1200 may be implemented by being separated from the plurality of camera modules 1100*a*, 1100*b*, and 1100*c*. For example, the application processor 1200 and the plurality of camera modules 1100*a*, 1100*b*, and 1100*c* may be implemented by being separated from each other as separate semiconductor chips.

The image processor 1210 may include a plurality of sub-image processors 1212*a*, 1212*b*, and 1212*c*, an image generator 1214, and a camera module controller 1216.

The image processor 1210 may include the plurality of sub-image processors 1212*a*, 1212*b*, and 1212*c* corresponding to the number of camera modules 1100*a*, 1100*b*, and 1100*c*.

Pieces of image data generated by the plurality of camera modules 1100*a*, 1100*b*, and 1100*c* may be provided to the plurality of sub-image processors 1212*a*, 1212*b*, and 1212*c* through image signal lines ISLa, ISLb, and ISLc separated from each other, respectively. For example, the image data generated by the camera module 1100*a* may be provided to the sub-image processor 1212*a* through the image signal line ISLa, the image data generated by the camera module 1100*b* may be provided to the sub-image processor 1212*b* through the image signal line ISLb, and the image data generated by the camera module 1100*c* may be provided to the sub-image processor 1212*c* through the image signal line ISLc. This image data transmission may be performed by using, for example, a camera serial interface (CSI) based on a mobile industry processor interface (MIPI), but the embodiments are not limited thereto.

Alternatively, according to some embodiments of the inventive concept, one sub-image processor may correspond to a plurality of camera modules. For example, instead that the sub-image processors 1212*a* and 1212*c* are implemented by being separated from each other as shown in FIG. 14, the sub-image processors 1212*a* and 1212*c* may be implemented by being integrated as one sub-image processor, and one of pieces of image data provided from the camera modules 1100*a* and 1100*c* may be selected through a selection element (e.g., a multiplexer) or the like and then provided to the integrated sub-image processor. In this case, the sub-image processor 1212*b* may not be integrated and may receive image data from the camera module 1100*b*.

In addition, according to some embodiments of the inventive concept, the image data generated by the camera module 1100*a* may be provided to the sub-image processor 1212*a* through the image signal line ISLa, the image data generated by the camera module 1100*b* may be provided to the sub-image processor 1212*b* through the image signal line ISLb, and the image data generated by the camera module 1100*c* may be provided to the sub-image processor 1212*c* through the image signal line ISLc. In addition, the image data processed by the sub-image processor 1212*b* may be directly provided to the image generator 1214, but one of the image data processed by the sub-image processor 1212*a* and the image data processed by the sub-image processor 1212*c* may be selected by a selection element (e.g., a multiplexer) or the like and then provided to the image generator 1214.

Each of the plurality of sub-image processors 1212*a*, 1212*b*, and 1212*c* may perform image processing such as bad pixel correction, 3A adjustment (auto-focus correction, auto-white balance, and auto-exposure), noise reduction, sharpening, gamma control, and remosaic on image data provided from each of the plurality of camera modules 1100*a*, 1100*b*, and 1100*c*.

According to some embodiments of the inventive concept, remosaic image processing may be performed by each of the plurality of camera modules 1100*a*, 1100*b*, and 1100*c*, and then image data after the remosaic image processing may be provided to each of the plurality of sub-image processors 1212*a*, 1212*b*, and 1212*c*.

The image data processed by each of the plurality of sub-image processors 1212*a*, 1212*b*, and 1212*c* may be provided to the image generator 1214. The image generator 1214 may generate an output image by using the image data received from each of the plurality of sub-image processors 1212*a*, 1212*b*, and 1212*c* according to image generation information (generating information) or a mode signal.

The image generator 1214 may generate an output image by merging at least a portion of image data generated by the plurality of camera modules 1100*a*, 1100*b*, and 1100*c* having different fields of view, according to the generating information or the mode signal. Alternatively, the image generator 1214 may generate an output image by selecting any one of pieces of image data generated by the plurality of camera modules 1100*a*, 1100*b*, and 1100*c* having different fields of view, according to the generating information or the mode signal.

According to some embodiments of the inventive concept, the generating information may include a zoom signal or a zoom factor. In addition, according to some embodiments of the inventive concept, the mode signal may be, for example, based on a mode selected by a user.

When the generating information is a zoom signal (or a zoom factor), and the plurality of camera modules 1100a, 1100b, and 1100c have different observation sights (fields of view), the image generator 1214 may perform a different operation according to a type of the zoom signal. For example, when the zoom signal is a first signal, an output image may be generated by using image data output from the sub-image processor 1212a between the image data output from the sub-image processor 1212a and image data output from the sub-image processor 1212c and image data output from the sub-image processor 1212b. When the zoom signal is a second signal that is different from the first signal, the image generator 1214 may generate an output image by using image data output from the sub-image processor 1212c between image data output from the sub-image processor 1212a and the image data output from the sub-image processor 1212c and image data output from the sub-image processor 1212b. When the zoom signal is a third signal that is different from the first and second signals, the image generator 1214 may not perform the image data merging and may generate an output image by selecting any one of pieces of image data output from the plurality of sub-image processors 1112a, 1112b, and 1112c. However, the embodiments are not limited thereto, and a method of processing image data may be modified and carried out in accordance with circumstances.

Referring to FIG. 15, according to some embodiments of the inventive concept, the image processor 1210 may further include a selector 1213 configured to select one of outputs of the plurality of sub-image processors 1112a, 1112b, and 1112c and deliver the selected output to the image generator 1214.

In this case, the selector 1213 may perform a different operation according to a zoom signal or a zoom factor. For example, when the zoom signal is a fourth signal (e.g., a zoom ratio is a first ratio), the selector 1213 may select one of outputs of the plurality of sub-image processors 1112a, 1112b, and 1112c and deliver the selected output to the image generator 1214.

Alternatively, when the zoom signal is a fifth signal (e.g., the zoom ratio is a second ratio) that is different from the fourth signal, the selector 1213 may sequentially deliver p outputs (p is a natural number of 2 or more) among outputs of the plurality of sub-image processors 1112a, 1112b, and 1112c to the image generator 1214. For example, the selector 1213 may sequentially deliver outputs of the sub-image processors 1112b and 1112c to the image generator 1214. Alternatively, the selector 1213 may sequentially deliver outputs of the sub-image processors 1112a and 1112b to the image generator 1214. The image generator 1214 may generate an output image by merging the sequentially received p outputs.

Herein, image processing such as demosaic, down scaling to a video/preview resolution size, gamma correction, and HDR processing may be previously performed by the plurality of sub-image processors 1112a, 1112b and 1212c, and then the processed image data may be delivered to the image generator 1214. Therefore, even when the processed image data is provided from the selector 1213 to the image generator 1214 through one signal line, an image merging operation of the image generator 1214 may be performed at a high speed.

According to some embodiments of the inventive concept, the image generator 1214 may generate merged image data having an increased dynamic range by receiving a plurality of pieces of image data having different exposure times from any one or any combination of the plurality of sub-image processors 1212a, 1212b, and 1212c and performing HDR processing on the plurality of pieces of image data.

The camera module controller 1216 may provide control signals to the respective camera modules 1100a, 1100b, and 1100c. The control signals generated by the camera module controller 1216 may be provided to the camera modules 1100a, 1100b, and 1100c through control signal lines CSLa, CSLb, and CSLc separated from each other, respectively.

According to the generating information or the mode signal, any one of the plurality of camera modules 1100a, 1100b, and 1100c may be assigned as a master camera (e.g., 1100b), and the other camera modules (e.g., 1100a and 1100c) may be assigned as slave cameras. This information may be included in a control signal and provided to the corresponding camera modules 1100a, 1100b, and 1100c through the control signal lines CSLa, CSLb, and CSLc separated from each other.

Camera modules operating as a master and slaves may be changed according to a zoom factor or an operation mode signal. For example, when a field of view of the camera module 1100a is wider than a field of view of the camera module 1100b, and the zoom factor indicates a low zoom ratio, the camera module 1100b may operate as a master, and the camera module 1100a may operate as a slave. On the contrary, when the zoom factor indicates a high zoom ratio, the camera module 1100a may operate as a master, and the camera module 1100b may operate as a slave.

According to some embodiments of the inventive concept, the control signals provided from the camera module controller 1216 to the respective camera modules 1100a, 1100b, and 1100c may include a sync enable signal. For example, when the camera module 1100b is a master camera, and the camera modules 1100a and 1100c are slave cameras, the camera module controller 1216 may transmit the sync enable signal to the camera module 1100b. The camera module 1100b that has received the sync enable signal may generate a sync signal based on the received sync enable signal and provide the generated sync signal to the camera modules 1100a and 1100c through a sync signal line SSL. The camera module 1100b and the camera modules 1100a and 1100c may be synchronized based on the sync signal and transmit image data to the application processor 1200.

According to some embodiments of the inventive concept, the control signals provided from the camera module controller 1216 to the plurality of camera modules 1100a, 1100b, and 1100c may include mode information according to the mode signal. The plurality of camera modules 1100a, 1100b, and 1100c may operate in a first operation mode and a second operation mode in association with a sensing speed based on the mode information.

In the first operation mode, the plurality of camera modules 1100a, 1100b, and 1100c may generate an image signal at a first speed (e.g., generate the image signal of a first frame rate), encode the generated image signal at a second speed that is higher than the first speed (e.g., encode the image signal of a second frame rate that is higher than the first frame rate), and transmit the encoded image signal to the application processor 1200. Herein, the second speed may be 30 times or less the first speed.

The application processor 1200 may store the received image signal, i.e., the encoded image signal, in the internal memory 1230 inside the application processor 1200 or in the external memory 1400 outside the application processor 1200, then read the encoded image signal from the internal memory 1230 or the external memory 1400, decode the encoded image signal, and display image data generated based the decoded image signal. For example, a corresponding sub-processor among the plurality of sub-processors 1212a, 1212b, and 1212c in the image processor 1210 may perform the decoding and perform image processing on the decoded image signal.

In the second operation mode, the plurality of camera modules 1100a, 1100b, and 1100c may generate an image signal at a third speed that is lower than the first speed (e.g., generate the image signal of a third frame rate that is lower than the first frame rate) and transmit the image signal to the application processor 1200. The image signal transmitted to the application processor 1200 may be a non-encoded signal. The application processor 1200 may perform image processing on the received image signal or store the received image signal in the internal memory 1230 or the external memory 1400.

The PMIC 1300 may supply power, e.g., a power supply voltage, to each of the plurality of camera modules 1100a, 1100b, and 1100c. For example, under control of the application processor 1200, the PMIC 1300 may supply first power to the camera module 1100a through a power signal line PSLa, supply second power to the camera module 1100b through a power signal line PSLb, and supply third power to the camera module 1100c through a power signal line PSLc.

The PMIC 1300 may generate power corresponding to each of the plurality of camera modules 1100a, 1100b, and 1100c in response to a power control signal PCON from the application processor 1200 and adjust a level of the power. The power control signal PCON may include a power adjustment signal for each operation mode of the plurality of camera modules 1100a, 1100b, and 1100c. For example, the operation mode may include a low power mode, and in this case, the power control signal PCON may include information about a camera module operating in the low power mode and a set power level. Levels of power provided to the plurality of camera modules 1100a, 1100b, and 1100c may be the same as or different from each other. In addition, the levels of power may be dynamically changed.

While the inventive concept has been shown and described with reference to embodiments thereof, it will be understood that various changes in form and details may be made therein without departing from the spirit and scope of the following claims.

What is claimed is:

1. A correlated double sampling (CDS) circuit comprising:
a first comparator configured to:
operate based on a first bias current; and
compare, with a ramp signal, a pixel voltage that is output from a pixel, during a first period and a fourth period during which the pixel operates in a low conversion gain (LCG) mode; and
a second comparator configured to:
operate based on a second bias current; and
compare, with the ramp signal, the pixel voltage output from the pixel, during a second period and a third period during which the pixel operates in a high conversion gain (HCG) mode, the second period being after the first period, the third period being after the second period, and the fourth period being after the third period, wherein the first comparator is further configured to operate based on a third bias current that is lower than the first bias current, during the second period and the third period, and
wherein the second comparator is further configured to operate based on a fourth bias current that is lower than the second bias current, during the first period and the fourth period.

2. The CDS circuit of claim 1, further comprising an input switch circuit configured to:
provide, to the first comparator, the pixel voltage output from the pixel, during the first period and the fourth period; and
provide, to the second comparator, the pixel voltage output of the pixel, during the second period and the third period.

3. The CDS circuit of claim 1, wherein the first comparator comprises:
a first capacitor;
a second capacitor;
an input stage comprising:
a first transistor configured to receive the pixel voltage through the first capacitor; and
a second transistor configured to receive the ramp signal through the second capacitor;
a first current source configured to generate a first current;
a second current source configured to generate a second current;
a first switch connected between the first current source and the input stage; and
a second switch connected between the second current source and the input stage,
wherein the first switch is configured to be always turned on, and
wherein the second switch is configured to be turned on during the first period and the fourth period.

4. The CDS circuit of claim 3, wherein, during the first period and the fourth period, a sum of the first current and the second current is provided to the input stage as the first bias current, and
wherein, during the second period and the third period, the first current is provided to the input stage as the third bias current.

5. The CDS circuit of claim 3, wherein the first comparator further comprises:
a first auto-zero switch connected between a first input node and a first output node of the first transistor; and
a second auto-zero switch connected between a second input node and a second output node of the second transistor,
wherein the first auto-zero switch and the second auto-zero switch are turned on during an initial period of the first period to perform an auto-zero operation.

6. The CDS circuit of claim 1, wherein the first comparator is further configured to:
receive, as the pixel voltage, an LCG reset signal indicating a reset level of the pixel during the first period; and
receive, as the pixel voltage, an LCG image signal according to charges that are generated by the pixel during the fourth period.

7. The CDS circuit of claim 6, wherein the first comparator is further configured to perform a first auto-zero operation, based on the ramp signal and the received LCG reset signal during an initial period of the first period.

8. The CDS circuit of claim 1, wherein the second comparator is further configured to:

receive, as the pixel voltage, an HCG reset signal indicating a reset level of the pixel during the second period; and receive, as the pixel voltage, an HCG image signal according to charges that are generated by the pixel during the third period.

9. The CDS circuit of claim 8, wherein the second comparator is further configured to perform a second auto-zero operation, based on the ramp signal and the received HCG reset signal during an initial period of the second period.

10. The CDS circuit of claim 1, wherein the pixel comprises:

a photoelectric conversion element configured to convert received light into charges;

a floating diffusion node storing the charges that are received from the photoelectric conversion element;

a transport transistor configured to connect the photoelectric conversion element to the floating diffusion node;

a reset transistor configured to reset the floating diffusion node;

a driving transistor configured to convert a potential of the floating diffusion node into the pixel voltage; and a gain control transistor configured to:
be turned on in the LCG mode to increase a capacitance of the floating diffusion node; and
be turned off in the HCG mode.

11. An image sensor comprising:

a pixel configured to:
output a first pixel signal in a first conversion gain mode; and
output a second pixel signal in a second conversion gain mode;

a ramp signal generator configured to generate a ramp signal of which a level falls with a slope; and a correlated double sampling (CDS) circuit configured to:
receive the first pixel signal and the second pixel signal from the pixel through a column line;
generate a first comparison result signal by comparing the ramp signal with the received first pixel signal; and
generate a second comparison result signal by comparing the ramp signal with the received second pixel signal, wherein the CDS circuit comprises:
a first comparator configured to:
operate based on a first bias current; and
compare, with the ramp signal, the received first pixel signal, during a first sub-period in a readout period for the pixel; and
a second comparator configured to:
operate based on a second bias current; and
compare, with the ramp signal, the received second pixel signal, during a second sub-period in the readout period, the second sub-period being after the first sub-period, and wherein the first comparator is further configured to operate based on a third bias current that is lower than the first bias current, during the second sub-period, and wherein the second comparator is further configured to operate based on a fourth bias current that is lower than the second bias current, during the first sub-period.

12. The image sensor of claim 11, further comprising a counting circuit configured to generate a first pixel value and a second pixel value, based on the generated first comparison result signal and the generated second comparison result signal.

13. The image sensor of claim 11, wherein the pixel is further configured to:

output a first reset signal according to the first conversion gain mode, during the first sub-period; and output a second reset signal according to the second conversion gain mode, during the second sub-period.

14. The image sensor of claim 11, wherein the first comparator comprises:

a first input stage comprising:
a first transistor configured to receive a first pixel signal through a first capacitor; and
a second transistor configured to receive the ramp signal through a second capacitor;

a first current source configured to generate a first current and connected to the first input stage;

a second current source configured to generate a second current; and a first switch connected between the second current source and the first input stage, wherein the first switch is configured to:
be turned on during the first sub-period; and
be turned off during the second sub-period.

15. The image sensor of claim 14, wherein the second comparator comprises:

a second input stage comprising:
a third transistor configured to receive a second pixel signal through a third capacitor; and
a fourth transistor configured to receive the ramp signal through a fourth capacitor;

a third current source configured to generate a third current and connected to the second input stage;

a fourth current source configured to generate a fourth current; and a second switch connected between the fourth current source and the second input stage, wherein the second switch is configured to:
be turned on during the second sub-period; and
be turned off during the first sub-period.

16. An operating method of a correlated double sampling (CDS) circuit comprising a first comparator and a second comparator, the method comprising:

generating a first reset value according to a first reset signal that is output from a pixel, by using the first comparator during a first period;

generating a second reset value according to a second reset signal that is output from the pixel, by using the second comparator during a second period;

generating a second image value according to a second image signal that is output from the pixel, by using the second comparator during a third period; and generating a first image value according to a first image signal that is output from the pixel, by using the first comparator during a fourth period, the second period being after the first period, the third period being after the second period, and the fourth period being after the third period, wherein, during the first period and the fourth period, the first comparator operates based on a first bias current, and wherein, during the second period and the third period, the first comparator operates based on a second bias current that is lower than the first bias current.

17. The method of claim 16, wherein, during the second period and the third period, the second comparator operates based on a third bias current, and wherein, during the first period and the fourth period, the second comparator operates based on a fourth bias current that is lower than the third bias current.

18. The method of claim 16, wherein the first comparator comprises:
a first input stage comprising:
a first input transistor configured to sequentially receive the first reset signal and the first image signal; and
a second input transistor configured to receive a ramp signal to be compared with the first reset signal and the first image signal;
a first current source configured to generate a first current flowing through the first input stage, and connected to the first input stage;
a second current source configured to generate a second current flowing through the first input stage; and
a switch connected between the second current source and the first input stage,
wherein, during the first period and the fourth period, the switch is turned on, and
wherein, during the second period and the third period, the switch is turned off.

19. The method of claim 16, wherein the pixel operates in a low conversion gain (LCG) mode during the first period and the fourth period, and operates in a high conversion gain (HCG) mode during the second period and the third period.

20. The method of claim 16, wherein a first pixel value is generated based on the first reset value and the first image value, and
wherein a second pixel value is generated based on the second reset value and the second image value.

* * * * *